US009989427B2

(12) United States Patent
Teshigawara et al.

(10) Patent No.: US 9,989,427 B2
(45) Date of Patent: Jun. 5, 2018

(54) FORCE SENSOR

(71) Applicant: NSK LTD., Tokyo (JP)

(72) Inventors: Seiichi Teshigawara, Kanagawa (JP); Kazuteru Tobita, Kanagawa (JP); Masaki Kuwahara, Kanagawa (JP)

(73) Assignee: NSK LTD., Tokyo (JP)

( * ) Notice: Subject to any disclaimer, the term of this patent is extended or adjusted under 35 U.S.C. 154(b) by 84 days.

(21) Appl. No.: 15/032,402

(22) PCT Filed: Nov. 4, 2014

(86) PCT No.: PCT/JP2014/079258
§ 371 (c)(1),
(2) Date: Apr. 27, 2016

(87) PCT Pub. No.: WO2015/068700
PCT Pub. Date: May 14, 2015

(65) Prior Publication Data
US 2016/0252410 A1    Sep. 1, 2016

(30) Foreign Application Priority Data

Nov. 5, 2013 (JP) ................ 2013-229613
Nov. 5, 2013 (JP) ................ 2013-229615
(Continued)

(51) Int. Cl.
*G01L 1/00*   (2006.01)
*G01L 1/22*   (2006.01)
(Continued)

(52) U.S. Cl.
CPC .............. *G01L 1/005* (2013.01); *G01D 5/12* (2013.01); *G01D 5/30* (2013.01); *G01L 1/2206* (2013.01); *G01L 5/166* (2013.01)

(58) Field of Classification Search
CPC ....... G01L 1/005; G01L 1/2206; G01L 5/166; G01D 5/12; G01D 5/30
See application file for complete search history.

(56) References Cited

U.S. PATENT DOCUMENTS 4,112,752 A    9/1978   Hafner et al.
6,249,367 B1*  6/2001   Hirose ................ G02B 7/1821
                                                359/199.3
(Continued)

FOREIGN PATENT DOCUMENTS

CN    101213430 A    7/2008
CN    101410776 A    4/2009
(Continued)

OTHER PUBLICATIONS

International Search Report of PCT/JP2014/079258 dated Dec. 16, 2014.
(Continued)

*Primary Examiner* — Lisa Caputo
*Assistant Examiner* — Philip Cotey
(74) *Attorney, Agent, or Firm* — Sughrue Mion, PLLC

(57) ABSTRACT

A force sensor includes: a base; a first movable portion arranged to face the base; a second movable portion arranged to face the first movable portion; a support that is provided on the base and rockably supports the first movable portion and the second movable portion; a joint that is provided to the support and rotatably supports the second movable portion; and a first detection unit that can detect a force component causing the first movable portion and the second movable portion to rock and a second detection unit that can detect a force component causing the second movable portion to rotate, when external force is applied to at least one of the first movable portion and the second movable portion.

15 Claims, 16 Drawing Sheets

(30) Foreign Application Priority Data

Dec. 6, 2013 (JP) ................................ 2013-253108
Dec. 6, 2013 (JP) ................................ 2013-253155

(51) Int. Cl.
    *G01L 5/16*     (2006.01)
    *G01D 5/12*     (2006.01)
    *G01D 5/30*     (2006.01)

(56) References Cited

U.S. PATENT DOCUMENTS

| | | | |
|---|---|---|---|
| 6,583,783 B1* | 6/2003 | Dietrich | G01L 5/166 345/158 |
| 9,027,417 B2* | 5/2015 | Sato | G01L 1/04 73/862.642 |
| 2002/0056326 A1* | 5/2002 | Gombert | G01L 5/166 73/862.046 |
| 2003/0102422 A1* | 6/2003 | Gombert | G01D 5/32 250/206.1 |
| 2004/0129899 A1* | 7/2004 | Gombert | G01L 5/166 250/548 |
| 2004/0232318 A1* | 11/2004 | Kitamura | G01L 5/166 250/221 |
| 2005/0051714 A1* | 3/2005 | Kitamura | G01D 5/34 250/231.1 |
| 2005/0185196 A1 | 8/2005 | Kitamura et al. | |
| 2005/0257627 A1 | 11/2005 | Kitamura et al. | |
| 2007/0097362 A1 | 5/2007 | Kitamura et al. | |
| 2007/0284512 A1* | 12/2007 | Tanabe | G01L 5/166 250/208.6 |
| 2009/0114040 A1 | 5/2009 | Mizuno | |
| 2010/0027033 A1* | 2/2010 | Becker | G01D 5/26 356/614 |
| 2010/0164873 A1* | 7/2010 | Senft | G01D 5/34 345/170 |
| 2010/0171704 A1* | 7/2010 | Senft | G01D 5/34 345/168 |
| 2010/0312394 A1 | 12/2010 | Arimitsu | |
| 2013/0014595 A1 | 1/2013 | Huizinga et al. | |
| 2013/0104666 A1* | 5/2013 | Takuma | G01G 19/4142 73/855 |
| 2013/0204142 A1* | 8/2013 | Bertholds | G01L 5/166 600/478 |
| 2015/0018840 A1* | 1/2015 | Monfaredi | A61B 34/30 606/130 |

FOREIGN PATENT DOCUMENTS

| | | |
|---|---|---|
| CN | 102879131 A | 1/2013 |
| EP | 1843243 A1 | 10/2007 |
| JP | 51-121376 U | 10/1976 |
| JP | 52-147479 A | 12/1977 |
| JP | 64-026188 U | 2/1989 |
| JP | 2005-241353 A | 9/2005 |
| JP | 2007-127501 A | 5/2007 |
| JP | 2010-210558 A | 9/2010 |
| JP | 2010-281635 A | 12/2010 |
| JP | 2011-080945 A | 4/2011 |

OTHER PUBLICATIONS

Communication dated May 30, 2017, from the European Patent Office in counterpart European Application No. 14860106.5.
Communication dated Mar. 16, 2018 from the State Intellectual Property Office of the P.R.C. in counterpart application No. 201480059251.5.

* cited by examiner

FORCE SENSOR

CROSS-REFERENCE TO RELATED APPLICATION

This application is a National Stage of PCT international application Ser. No. PCT/JP2014/079258 filed on Nov. 4, 2014 which designates the United States, incorporated herein by reference, and which is based upon and claims the benefit of priority from Japanese Patent Application No. 2013-229613 filed on Nov. 5, 2013, Japanese Patent Application No. 2013-229615 filed on Nov. 5, 2013, Japanese Patent Application No. 2013-253108 filed on Dec. 6, 2013, and Japanese Patent Application No. 2013-253155 filed on Dec. 6, 2013, the entire contents of which are incorporated herein by reference.

FIELD

The present invention relates to a force sensor capable of detecting external force.

BACKGROUND

There is known a force sensor that detects external force applied to a structure by detecting, with a sensor, a displacement of the structure caused by the external force and performing arithmetic processing on a result of the detection by the sensor. In particular, each of Patent Literatures 1, 2, and 3 discloses a force sensor that detects, with an optical sensor, a displacement of a structure caused by external force.

CITATION LIST

Patent Literature

Patent Literature 1: Japanese Patent Application Laid-open Publication No. 2010-281635
Patent Literature 2: Japanese Patent Application Laid-open Publication No. 2007-127501
Patent Literature 3: Japanese Patent Application Laid-open Publication No. 2010-210558

SUMMARY

Technical Problem

The technology disclosed in Patent Literatures 1, 2, and 3 includes a movable portion undergoing a displacement when external force is applied thereto and a fixed portion not undergoing a displacement when external force is applied thereto, where an optical sensor measures a relative amount of displacement between the fixed portion and the movable portion. In the technology disclosed in Patent Literatures 1, 2, and 3, however, complex arithmetic processing is required to separately detect multi-directional external force from information on the relative amount of displacement between the fixed portion and the movable portion. This may cause deterioration in responsiveness of the force sensor.

The present invention has been made in consideration of the aforementioned problem, where an object of the present invention is to provide a force sensor capable of improving detection responsiveness by facilitating the arithmetic processing performed to detect the external force.

Solution to Problem

To achieve the above-described object, an aspect of the present invention provides a force sensor including: a base; a first movable portion arranged to face the base; a second movable portion arranged to face the first movable portion; a support that is provided on the base and rockably supports the first movable portion and the second movable portion; a joint that is provided to the support and rotatably supports the second movable portion; and a first detection unit that can detect a force component causing the first movable portion and the second movable portion to rock and a second detection unit that can detect a force component causing the second movable portion to rotate, when external force is applied to at least one of the first movable portion and the second movable portion.

Accordingly, when external force is applied to the force sensor, the first detection unit processes information on the force component causing the first movable portion and the second movable portion to rock. The second detection unit processes information on the force component causing the second movable portion to rotate. The first detection unit and the second detection unit thus process the information on the force components acting in mutually different directions among multi-directional force components included in the same external force. Each of the first detection unit and the second detection unit therefore processes less information on the direction of the force component compared to a conventional technology. As a result, the force sensor can improve detection responsiveness by facilitating arithmetic processing performed to detect external force.

As a desirable embodiment of the present invention, preferably, the first movable portion and the second movable portion are arranged above the base in a vertical direction. Accordingly, a load applied to the joint supporting the second movable portion mainly corresponds to the weight of the second movable portion and the external force. Therefore, the load applied to the joint supporting the second movable portion is smaller than a load when the first movable portion and the second movable portion are arranged below the base in a vertical direction. Therefore, the force sensor according to the present invention can prevent possible breakage of the joint by decreasing the load applied to the joint that supports the second movable portion.

As a desirable embodiment of the present invention, preferably, the first detection unit includes three or more sensors, and the sensors are capable of emitting light and detecting reflected light of the light. Each of the sensors can thus radiate light to a reflector stuck to the first movable portion and detect a reflected-light intensity of the light. The first detection unit radiates the light toward the reflector having a flat portion with a relatively large area. Accordingly, the force sensor according to the present invention does not require high-precision positioning as required when a light emitting part and a light receiving part are provided separately and arranged to face each other. As a result, the force sensor according to the present invention can prevent degradation in detection precision resulting from the arrangement of the sensor.

As a desirable embodiment of the present invention, preferably, the first detection unit includes four sensors, and two of the four sensors are arranged on one straight line while remaining two sensors are arranged on another straight line orthogonal to the one straight line. Accordingly, the force sensor of the present invention can detect moment about one axis on the basis of sensor outputs of the two sensors arranged on the one straight line and detect moment about a different axis on the basis of sensor outputs of the two sensors arranged on the other straight line orthogonal to the one straight line. As a result, the force sensor can further facilitate the arithmetic processing performed to detect external force.

As a desirable embodiment of the present invention, preferably, the support includes: a first fixture supported by the base; a plate spring portion that has a plate-like shape and is supported by the first fixture through a spacer to be able to undergo elastic deformation; and a second fixture supported by the plate spring portion through a spacer, the plate spring portion includes: a base portion having a plate-like shape; and a plurality of protrusions, where the protrusions are on the same plane as the base portion and protrude from the base portion, and surfaces of the protrusions come into contact with the spacer, and, when external force is applied to the first movable portion, a part of each of the protrusions deforms depending on a displacement of the first movable portion, the part being closer to the base portion relative to a position in contact with the spacer. The external force applied to the movable portion thus propagates to the plate spring portion through the spacer and causes the protrusion to undergo elastic deformation. Accordingly, the force sensor of the present invention can prevent wobbling in an operation that causes the movable portion to rock when external force is applied to the movable portion and causes the movable portion to be restored to an original position when the external force is removed. As a result, the force sensor according to the present invention can prevent degradation in the precision of detecting external force resulting from the wobbling.

As a desirable embodiment of the present invention, preferably, the support includes a plurality of the plate spring portions connected to face one another with spacing formed among the plate spring portions. This allows each of the plate spring portions to be deformed when external force causing a parallel movement of the movable portion toward the base is applied to the force sensor of the present invention. Therefore, as the number of the plate spring portions increases, the amount of parallel movement of the movable portion toward the base increases. As a result, the amount of movement of the movable portion can be adjusted when the external force causing the parallel movement of the movable portion toward the base is applied to the force sensor of the present invention. Moreover, the force sensor according to the present invention is possibly operated by receiving external force directly from an operator being a human. As a result, the force sensor of the present invention can make the operator perceive the movement of the movable portion more easily to improve operability when the operator applies the external force that causes the parallel movement of the movable portion toward the base.

As a desirable embodiment of the present invention, preferably, the first detection unit includes three or more sensors that are provided on a top surface of the base and are capable of emitting light and obtaining a distance to a detection target by detecting reflected light of the light, and the first detection unit detects an angle of inclination of the first movable portion by using positions of the sensors and the distance to the detection target. Each of the sensors can thus radiate light to a reflector stuck to the first movable portion and detect a reflected-light intensity of the light. The first detection unit radiates the light toward the reflector having a flat portion with a relatively large area. Accordingly, the force sensor according to the present invention does not require high-precision positioning as required when the light emitting part and the light receiving part are provided separately and arranged to face each other. As a result, the force sensor according to the present invention can prevent degradation in detection precision resulting from the arrangement of the sensor.

As a desirable embodiment of the present invention, preferably, the first detection unit includes three sensors that are arranged at equal intervals, each interval being 120°, in a circumferential direction on a top surface of the base. The spacing among the sensors is increased as a result. The force sensor can thus improve precision of detecting the angle of inclination of the first movable portion.

As a desirable embodiment of the present invention, preferably, the first detection unit includes four or more sensors, uses three of the sensors as a first set to detect an angle of inclination of the first movable portion on the basis of a position of each of the three sensors and the distance to the detection target, uses three of the sensors as a second set in which at least one sensor is different from the first set to detect an angle of inclination of the first movable portion, and obtains an angle of inclination of the first movable portion by averaging a plurality of detected results. As a result, the force sensor can obtain a more accurate angle by averaging the two results. Moreover, the force sensor can be used without interruption even when one of the sets fails.

As a desirable embodiment of the present invention, preferably, the force sensor further includes: a first stopper restricting a rocking angle of the first movable portion and the second movable portion; a second stopper restricting an amount of displacement of the first movable portion and the second movable portion in a direction in which the support is to be extended; and a third stopper restricting an angle of rotation about a central axis of the second movable portion. As a result, the force sensor can prevent breakage of the support or the like even when excessive external force acts on the force sensor.

As a desirable embodiment of the present invention, preferably, the first stopper is a portion protruding from the base toward the first movable portion, is provided at three or more positions at equal intervals in a circumferential direction about a central axis of the support, and has a height from the base allowing a tip of the first stopper to come into contact with the first movable portion when a load exceeding a load with which the support can undergo elastic deformation is applied to the force sensor. Accordingly, the force sensor can prevent permanent deformation of the support even when excessive external force causing the first movable portion and the second movable portion to rock is applied to the force sensor.

As a desirable embodiment of the present invention, preferably, the second stopper is a flanged portion that is provided at an upper end of a housing arranged to cover a periphery of the force sensor and protrudes toward a center, and has a height allowing a lower end face of the second stopper to come into contact with the second movable portion when a load exceeding a load with which the support can undergo elastic deformation is applied to the force sensor. Accordingly, the second movable portion undergoing a certain amount of displacement comes into contact with the lower end face of the second stopper and does not undergo further displacement. The force sensor can therefore prevent permanent deformation of the support.

As a desirable embodiment of the present invention, preferably, the third stopper includes permanent magnets that are provided on, respectively, surfaces of the first movable portion and the second movable portion facing each other, the permanent magnet provided on the first movable portion protrudes from the surface of the first movable portion toward the second movable portion, and the permanent magnet provided on the second movable portion protrudes from the surface of the second movable portion toward the first movable portion and is provided at positions sandwiching the permanent magnet provided on the first movable portion in a circumferential direction. Accordingly, when external force is applied to cause the second movable portion to rotate, the plurality of third stoppers moves closer to one another to have increased repulsion and generate reaction force against the external force. The force sensor can therefore prevent breakage of the joint or the like.

As a desirable embodiment of the present invention, preferably, the joint includes a shaft passing through the second movable portion, and a first internal passage passing through the base, a second internal passage passing through the support, and a third internal passage passing through the shaft are arranged on the same straight line. As a result, a wiring or piping provided in the force sensor can reach the second movable portion from the base through the first internal passage, the second internal passage, and the third internal passage. The force sensor can thus achieve size reduction of the force sensor as a whole compared to when the wiring or piping passes outside each member.

Advantageous Effects of Invention

According to the preset invention, there can be provided the force sensor that can improve detection responsiveness by facilitating the arithmetic processing performed to detect the external force.

DESCRIPTION OF EMBODIMENTS

Modes of carrying out the present invention (embodiments) will be described in detail with reference to the drawings. The present invention is not to be limited by what is described in the following embodiments. Moreover, components described below include one that is easily conceivable by those skilled in the art and one that is substantially identical. The components described below can also be combined as appropriate.

Embodiments

Figure 1:
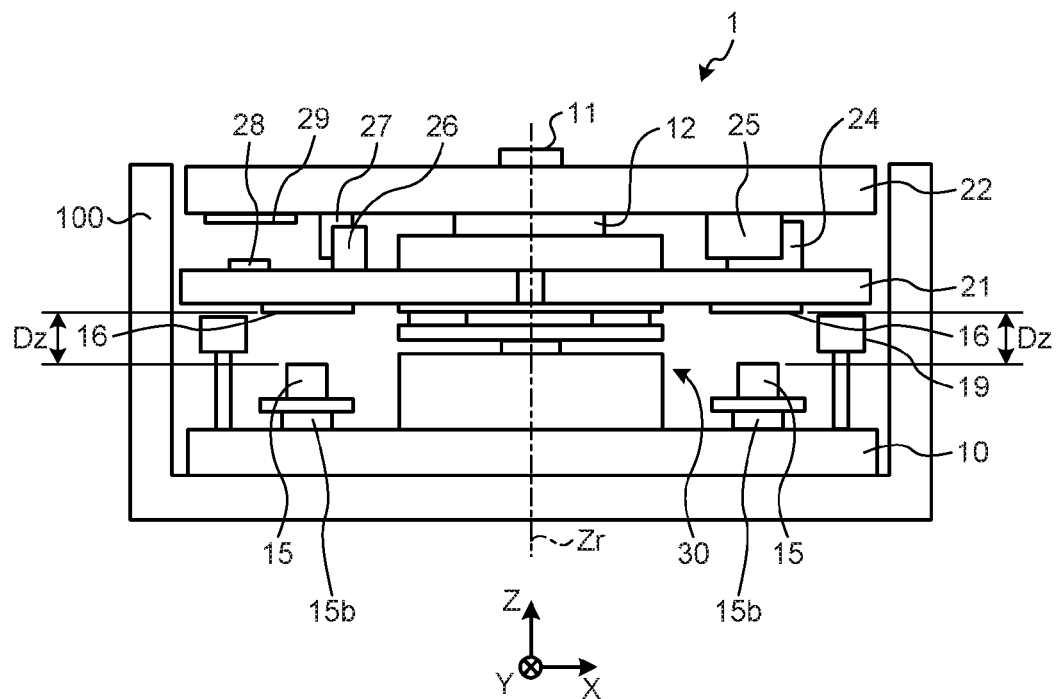
FIG. 1 is a schematic view illustrating a force sensor according to the present embodiment.

FIG. 1 is a schematic view illustrating a force sensor according to the present embodiment. A force sensor 1 is a device capable of detecting external force applied thereto. The force sensor 1 can be connected to a rotary machine such as a motor that regulates a motion of a robot, for example. The force sensor 1 can detect magnitude and a direction of the applied external force and transmit a control signal to be transmitted to a control unit controlling the motor or the like according to the magnitude and direction of the applied external force.

The force sensor 1 includes a base 10, a first movable portion 21, and a second movable portion 22. The base 10 is a disc-like member fixed to a bottom surface of a cylindrical housing 100 and includes a support 30, for example. Note that the base 10 may be integrated with the bottom surface of the housing 100. The following description will use a rectangular coordinate system including a Z axis parallel to a central axis Zr of the base 10, an X axis orthogonal to the Z axis, and a Y axis orthogonal to the Z axis and the X axis. The support 30 rockably supports the first movable portion 21 and the second movable portion 22. The support 30 is a disc-shaped coupling, for example, and is fixed to the center of a surface of the base 10.

Figure 2:
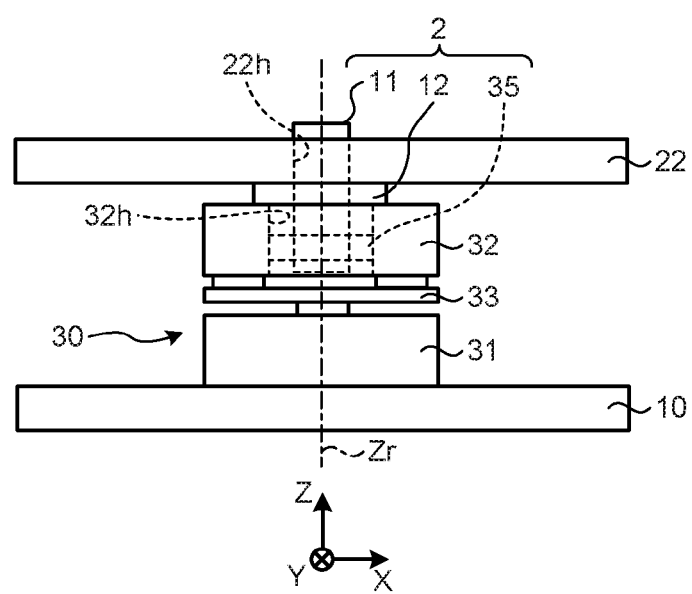
FIG. 2 is a schematic view illustrating a base, a support, and a second movable portion according to the present embodiment.
Figure 3:
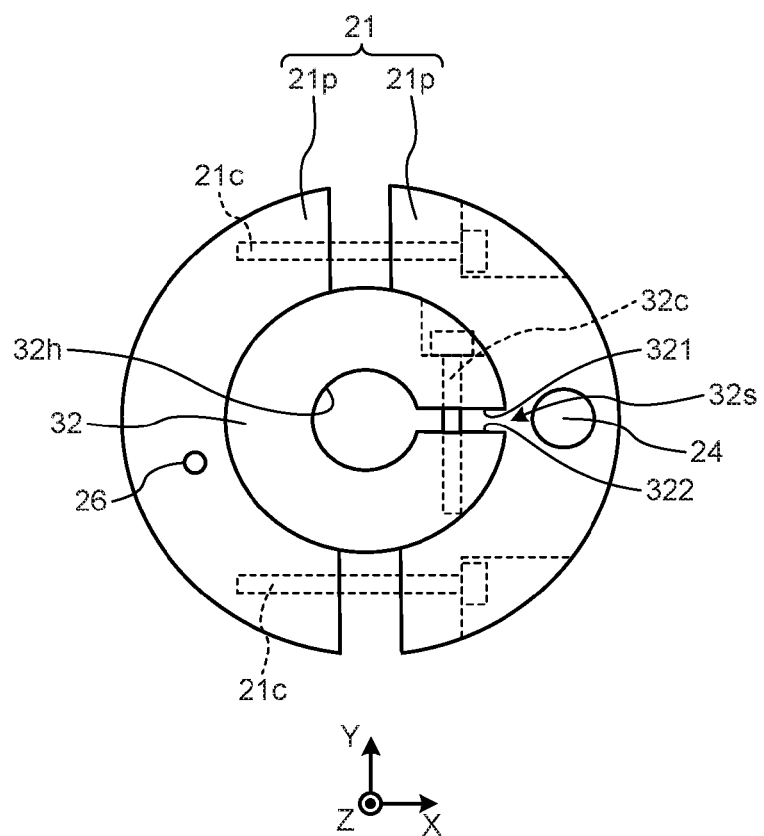
FIG. 3 is a plan view illustrating the support and a first movable portion according to the present embodiment.
Figure 4:
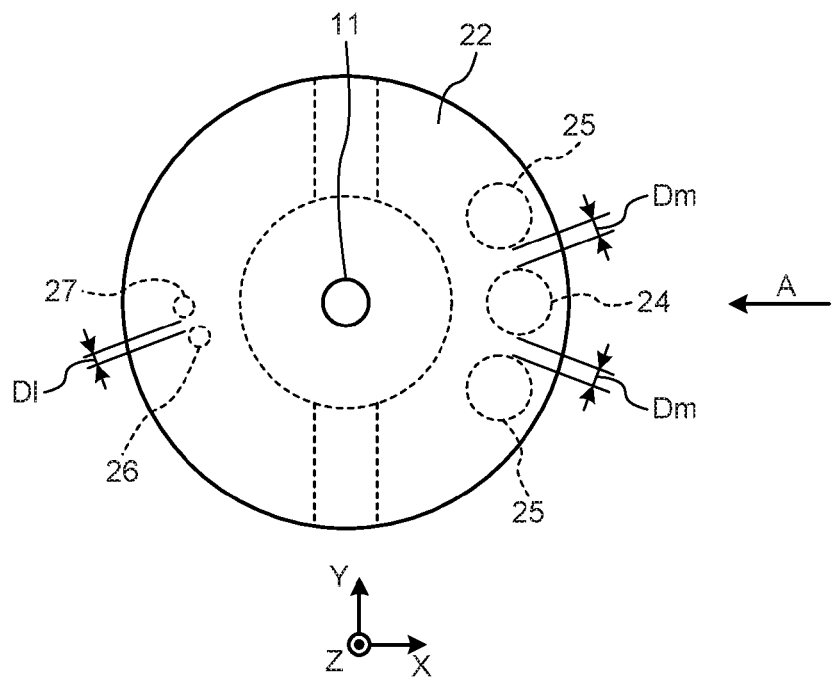
FIG. 4 is a plan view illustrating a shaft and the second movable portion according to the present embodiment.

FIG. 2 is a schematic view illustrating the base, the support, and the second movable portion according to the present embodiment. FIG. 3 is a plan view illustrating the support and the first movable portion according to the present embodiment. FIG. 4 is a plan view illustrating a shaft and the second movable portion according to the present embodiment. As illustrated in FIG. 2, the support 30 includes a lower fixture 31, an upper fixture 32, and a disc 33. The lower fixture 31 is a cylindrical member made of metal such as aluminum and fixed to the base 10 such that an end face of the lower fixture 31 is perpendicular to the Z axis. The upper fixture 32 is a cylindrical member made of metal such as aluminum and fixed to the lower fixture 31 through the disc 33 such that an end face of the upper fixture 32 is perpendicular to the Z axis. The disc 33 is a plate spring, for example. The disc 33 is level in a Z-axis direction throughout a circumferential direction about the central axis Zr being the center, when no external force is applied. When external force is applied, on the other hand, the disc 33 is deformed so that one side thereof with respect to the central axis Zr is raised in the Z-axis direction while the other side of the disc 33 is lowered in the Z-axis direction. As a result, the upper fixture 32 can be tilted depending on the deformation of the disc 33 when external force is applied.

Moreover, as illustrated in FIG. 3, the upper fixture 32 includes a through hole 32h passing through the upper fixture 32 in the Z-axis direction and a slit 32s that is an opening formed orthogonal to the Z axis. The upper fixture 32 is therefore C-shaped when viewed in the Z-axis direction. The upper fixture 32 also includes a bolt 32c that connects end faces 321 and 322 facing each other while interposing the slit 32s therebetween. The distance from the end face 321 to the end face 322 is decreased when the bolt 32c is tightened. The diameter of the through hole 32h is reduced as a result. The bolt 32c can thus adjust the diameter of the through hole 32h.

The second movable portion 22 is supported on the support 30 to be able to rotate about the Z axis by a joint 2. The joint 2 includes a deep groove ball bearing 35, a shaft 11, and a thrust roller bearing 12, for example. As illustrated in FIG. 2, the deep groove ball bearing 35 is fitted into the through hole 32h of the upper fixture 32. The deep groove ball bearing 35 is inserted into the through hole 32h with the bolt 32c loosened and is then fixed by tightening the bolt 32c to reduce the diameter of the through hole 32h. The columnar shaft 11 is press-fitted and fixed inside an inner ring of the deep groove ball bearing 35, for example. One end of the shaft 11 is positioned inside the through hole 32h, while the other end of the shaft 11 protrudes in the Z-axis direction from an end face of the upper fixture 32. When external force is applied to the upper fixture 32 and the shaft 11, the upper fixture 32 and the shaft 11 rock with respect to the lower fixture 31 as a point of support such that a central axis of the shaft 11 forms an angle with the central axis Zr of the base 10. The term "rock" hereinafter refers to a motion of the central axis of the shaft 11 rocking with respect to the lower fixture 31 as the point of support while forming an angle with the central axis Zr of the base 10. Note that when the base 10 is not disc-shaped, the term "rock" refers to a motion of the central axis of the shaft 11 rocking with respect to the lower fixture 31 as the point of support while forming an angle with a straight line perpendicular to the surface of the base 10.

The second movable portion 22 is fixed to a part of the shaft 11 protruding from the upper fixture 32. The second movable portion 22 is a disc-shaped rigid body including a through hole 22h passing through the second movable portion 22 in the Z-axis direction, for example. The second movable portion 22 is fixed parallel to the base 10 by press-fitting the shaft 11 into the through hole 22h. Moreover, for example, the thrust roller bearing 12 is arranged between the upper fixture 32 and the second movable portion 22. The second movable portion 22 is supported on the support 30 to be able to rotate about the Z axis by the deep groove ball bearing 35 and the shaft 11 as well as supported to be able to rotate more smoothly by the thrust roller bearing 12. While the second movable portion 22 rotates about the Z axis, the first movable portion 21 and the base 10 do not rotate about the Z axis. Note that the joint 2 need not include the thrust roller bearing 12.

As illustrated in FIG. 3, the first movable portion 21 is a member having a cylindrical shape as a whole and fixed to surround an outer periphery of the upper fixture 32. Moreover, the first movable portion 21 is fixed to be parallel to the second movable portion 22. The first movable portion 21 for example includes two first movable portion pieces 21p each being a semi-cylindrical rigid body, and is fixed to the upper fixture 32 by connecting the two first movable portion pieces 21p arranged to sandwich the upper fixture 32 with a bolt 21c. Note that the method of fixing the first movable portion 21 is not limited to the aforementioned method.

Therefore, as illustrated in FIG. 1, the first movable portion 21 is arranged to face the base 10 while the second movable portion 22 is arranged to face the first movable portion 21. The base 10, the first movable portion 21, and the second movable portion 22 maintain a state parallel to one another when no external force is applied to the force sensor 1. Moreover, the first movable portion 21 and the second movable portion 22 are rockably supported by the support 30 including the disc 33. The second movable portion 22 is also supported to be able to rotate about the Z axis by the joint 2. Moreover, in the present embodiment, the first movable portion 21 and the second movable portion 22 are arranged above the base 10 in a vertical direction.

As illustrated in FIG. 1, the base 10 includes a first sensor 15. The first sensor 15 is a photo-reflector or the like and is fixed to the surface of the base 10 through a sensor base 15b. Outside the support 30, for example, the first sensor 15 is arranged at four positions evenly spaced in a circumferential direction about the center being the central axis Zr. Moreover, two of the four first sensors 15 are arranged on a straight line parallel to the X axis, and the remaining two first sensors 15 are arranged on a straight line parallel to the Y axis.

As illustrated in FIG. 1, the base 10 includes a stopper 19. The stopper 19 is a protrusion protruding further in the Z-axis direction than the first sensor 15. Outside the first sensor 15, the stopper 19 is arranged at four positions evenly spaced in a circumferential direction about the center being the Z axis, for example. Note that the stoppers 19 may instead be arranged inside the first sensor 15. The height of each of the stoppers 19 in the Z-axis direction is adjusted such that a tip of each of the stoppers 19 comes into contact with the first movable portion 21 when a load exceeding a load with which the support 30 can undergo elastic deformation is applied to the force sensor 1, for example. Accordingly, the stoppers 19 can prevent permanent deformation of the support 30 when excessive external force causing the first movable portion 21 and the second movable portion 22 to rock is applied to the force sensor 1.

Moreover, as illustrated in FIG. 1, the first movable portion 21 includes a permanent magnet 24 on a surface thereof facing the second movable portion 22, and the second movable portion 22 includes two permanent magnets 25 on a surface thereof facing the first movable portion 21. The permanent magnet 24 protrudes from the surface of the first movable portion 21 toward the second movable portion 22, whereas the permanent magnets 25 protrude from the surface of the second movable portion 22 toward the first movable portion 21. Moreover, as viewed in the Z-axis direction, the permanent magnet 24 and the two permanent magnets 25 are arranged on a circumference of the same circle around the center being the central axis Zr. The two permanent magnets 25 are arranged on both sides of the permanent magnet 24 at equal intervals in the circumferential direction.

Figure 5:
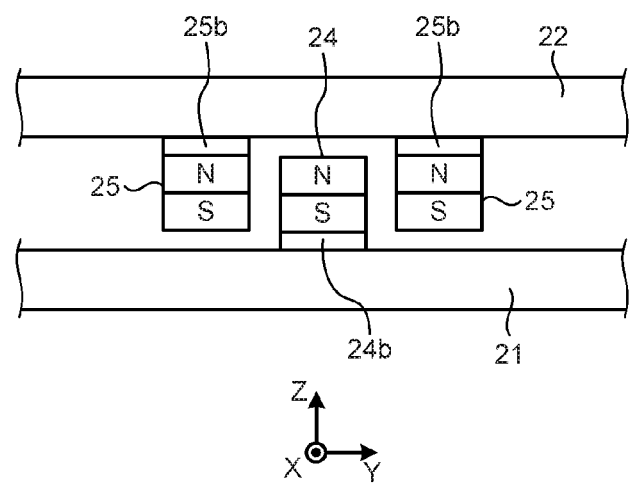
FIG. 5 is a view on arrow A of FIG. 4.

FIG. 5 is a view on arrow A of FIG. 4. The permanent magnet 24 is fixed to the first movable portion 21 through a base 24b by an adhesive, for example. The permanent magnet 24 is arranged such that an N pole and an S pole of the magnet are aligned in the Z-axis direction. The permanent magnets 25 are fixed to the second movable portion 22 through a base 25b by an adhesive, for example. Each of the permanent magnets 25 is arranged such that an N pole and an S pole of the magnet are aligned in the Z-axis direction. Moreover, the permanent magnet 24 and the permanent magnets 25 are arranged such that the S poles and the N poles of the magnets face each other in the circumferential direction. Accordingly, when no external force is applied to the force sensor 1, repulsion between the permanent magnet 24 and each permanent magnet 25 is balanced so that an angle of rotation of the second movable portion 22 about the Z axis relative to the first movable portion 21 is fixed. When external force is applied to cause the second movable portion 22 to rotate about the Z axis, the distance between the permanent magnet 24 and the permanent magnet 25 is decreased to have increased repulsion therebetween and generate reaction force against the external force. The force sensor 1 can therefore prevent breakage of the joint 2 or the like. Once the external force is removed, the angle of rotation of the second movable portion 22 about the Z axis relative to the first movable portion 21 is restored to an angle at the time no external force is applied. Note that the repulsion generated between the permanent magnet 24 and the permanent magnet 25 can be adjusted by adjusting magnetic force of the permanent magnet 24 and the permanent magnet 25 or adjusting the height of the base 24b and the base 25b in the Z-axis direction.

Moreover, as illustrated in FIG. 1, the first movable portion 21 includes a stopper 26 on the surface thereof facing the second movable portion 22, and the second movable portion 22 includes a stopper 27 on the surface thereof facing the first movable portion 21. The stopper 26 protrudes from the surface of the first movable portion 21 toward the second movable portion 22. The stopper 27 protrudes from the surface of the second movable portion 22 toward the first movable portion 21. Moreover, as viewed in the Z-axis direction, the stopper 26 and the stopper 27 are arranged on a circumference of the same circle around the center being the central axis Zr. A distance Dl in the circumferential direction between the stopper 26 and the stopper 27 is smaller than a distance Dm in the circumferential direction between the permanent magnet 24 and each permanent magnet 25. Accordingly, when external force is applied to cause the second movable portion 22 to rotate about the Z axis, the permanent magnet 24 does not come into contact with either one of the permanent magnets 25 because the stopper 26 and the stopper 27 come into contact with each other first. The stopper 26 and the stopper 27 can therefore prevent collision of the permanent magnet 24 and the permanent magnets 25 and breakage thereof.

As illustrated in FIG. 1, the first movable portion 21 includes a reflector 16 on a surface thereof facing the base 10. The reflector 16 is arranged at positions facing the four first sensors 15. A reflectance of light on the surface of each reflector 16 is uniform, and reflectances of the four reflectors 16 are equal, for example. Each first sensor 15 serving as a photo-reflector includes a light receiving part and a light emitting part, and can emit light as well as detect a reflected-light intensity of the light. Each first sensor 15 is fixed such that the light receiving part and the light emitting part of the sensor face the first movable portion 21. The light emitted from the light emitting part of each first sensor 15 reflects off the corresponding reflector 16 and enters the light receiving part of each first sensor 15. Each first sensor 15 changes a sensor output according to the magnitude of the detected reflected-light intensity.

The reflected-light intensity that is detected by each first sensor 15 changes depending on a distance from each first sensor 15 to the corresponding reflector 16 as well as the reflectance of the reflector 16. When no external force is applied to the force sensor 1, the four first sensors 15 and the reflectors 16 facing the respective first sensors 15 are all separated by an equal distance Dz because the base 10, the first movable portion 21, and the second movable portion 22 are parallel to one another. Since the reflectances of the four reflectors 16 are equal to one another, the reflected-light intensities detected by the four first sensors 15 are equal to one another when no external force is applied to the force sensor 1.

Figure 6:
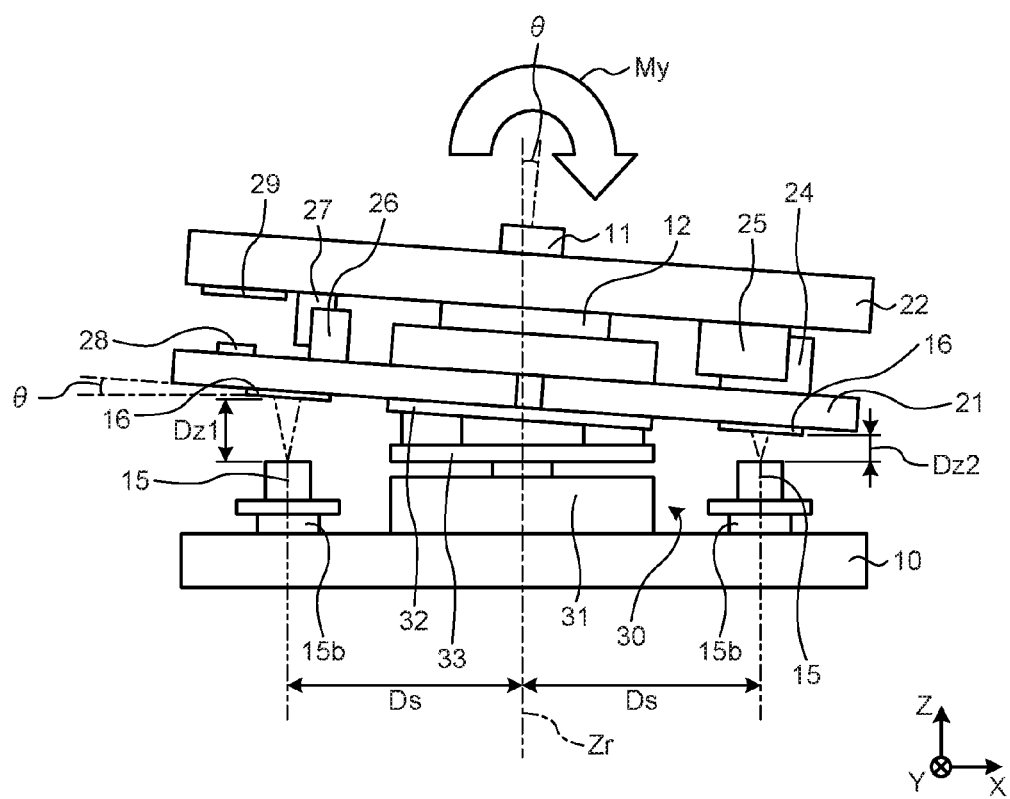
FIG. 6 is a schematic view illustrating a state in which moment about a Y axis is applied to the force sensor according to the present embodiment.

FIG. 6 is a schematic view illustrating a case where moment about the Y axis is applied to the force sensor according to the present embodiment. Note that the stopper 19 is omitted in FIG. 6 to provide clear illustration of the deformation in the figure. Moment My about the Y axis is a first force component that causes the first movable portion 21 and the second movable portion 22 to rock. When the moment My about the Y axis is applied to the force sensor 1, the disc 33 of the support 30 is deformed, so that the first movable portion 21 and the second movable portion 22 rock and are tilted by a predetermined angle θ with respect to a YZ plane. As a result, the first movable portion 21 is tilted by the angle θ with respect to an XY plane. The first movable portion 21 and the second movable portion 22 rock together and thus remain parallel to each other. Moreover, the first movable portion 21 is tilted with respect to the base 10. As a result, a distance Dz1 from one of the two first sensors 15 arranged on the straight line parallel to the X axis to the corresponding reflector 16 facing the first sensor 15 becomes larger than the distance Dz. A distance Dz2 from the other one of the two first sensors 15 arranged on the straight line parallel to the X axis to the corresponding reflector 16 facing the first sensor 15 becomes smaller than the distance Dz. Specifically, where Ds denotes the distance from the central axis Zr to each first sensor 15, the distance Dz1 is larger than the distance Dz by Ds×tan θ, and the distance Dz2 is smaller than the distance Dz by Ds×tan θ). This results in a difference between the reflected-light intensities detected by the two first sensors 15 arranged on the straight line parallel to the X axis. The force sensor 1 detects the magnitude and direction of the applied moment My about the Y axis on the basis of the difference in the reflected-light intensities.

When moment about the X axis is applied to the force sensor 1, the force sensor 1 detects the magnitude and direction of the applied moment about the X axis on the basis of a difference between the reflected-light intensities detected by the two first sensors 15 arranged on the straight line parallel to the Y axis. Description of the respective distances between the first sensors 15 and the reflectors 16 is omitted as it is similar to the aforementioned case where the moment My about the Y axis is applied to the force sensor 1.

As illustrated in FIG. 1, the first movable portion 21 includes a second sensor 28 on the surface thereof facing the second movable portion 22, and the second movable portion 22 includes a reflector 29 on the surface thereof facing the first movable portion 21. The second sensor 28 is a photo-reflector or the like and is fixed such that a light emitting part and a light receiving part of the second sensor 28 face the second movable portion 22. The reflector 29 is arranged at a position facing the second sensor 28.

Figure 7:
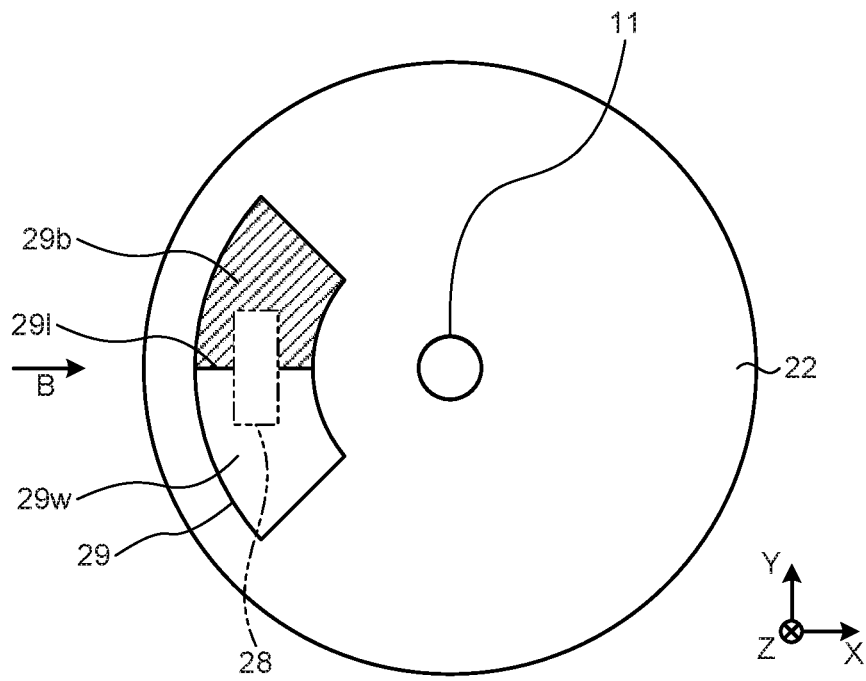
FIG. 7 is a schematic view illustrating a second sensor and a reflector according to the present embodiment.

FIG. 7 is a schematic view illustrating the second sensor and the reflector according to the present embodiment. The reflector 29 is a plate-like member made of paper, for example, and includes a high reflectance region 29w and a low reflectance region 29b having a lower light reflectance than the high reflectance region 29w. The high reflectance region 29w is a fan-shaped region painted white, for example. The low reflectance region 29b is a fan-shaped region painted black, for example. The high reflectance region 29w and the low reflectance region 29b are separated by a boundary 291 parallel to a radial direction. The second sensor 28 is arranged to face both the high reflectance region 29w and the low reflectance region 29b, for example. Moreover, the light emitting part of the second sensor 28 is arranged to overlap the boundary 291 when viewed in the Z-axis direction, for example.

Figure 8:
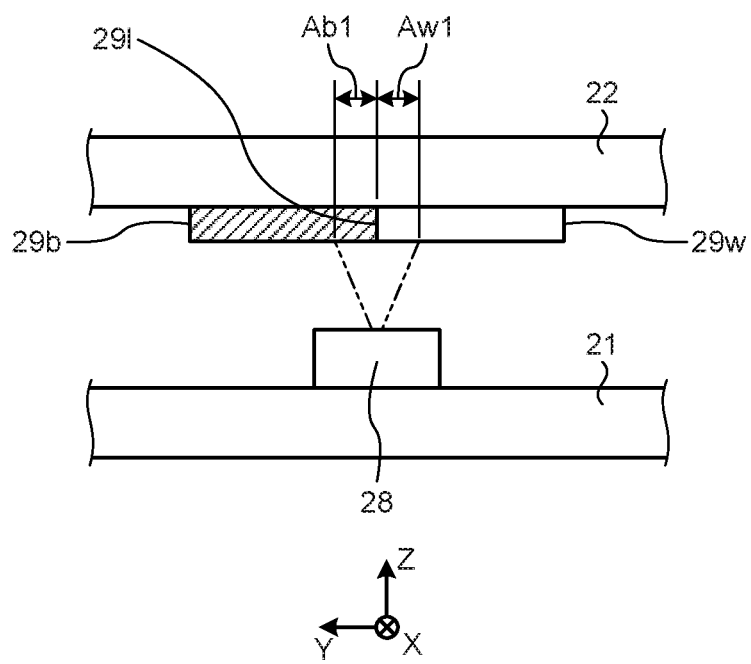
FIG. 8 is a view on arrow B of FIG. 7.

FIG. 8 is a view on arrow B of FIG. 7. As indicated with a two-dot chain line in FIG. 8, the light emitting part of the second sensor 28 emits light radially toward the reflector 29. When no external force is applied to the force sensor 1, the light emitting part of the second sensor 28 radiates light to each of the high reflectance region 29w and the low reflectance region 29b by the same area. That is, as illustrated in FIG. 8, the area of a region Aw1 irradiated with light in the high reflectance region 29w is equal to the area of a region Ab1 irradiated with light in the low reflectance region 29b.

Figure 9:
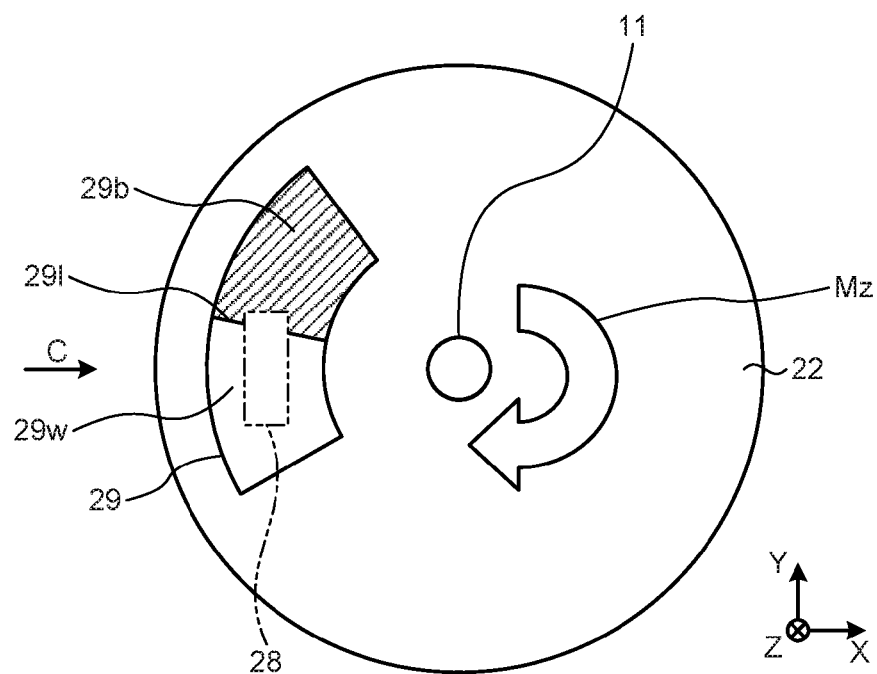
FIG. 9 is a schematic view illustrating a state in which moment about a Z axis is applied to the force sensor according to the present embodiment.
Figure 10:
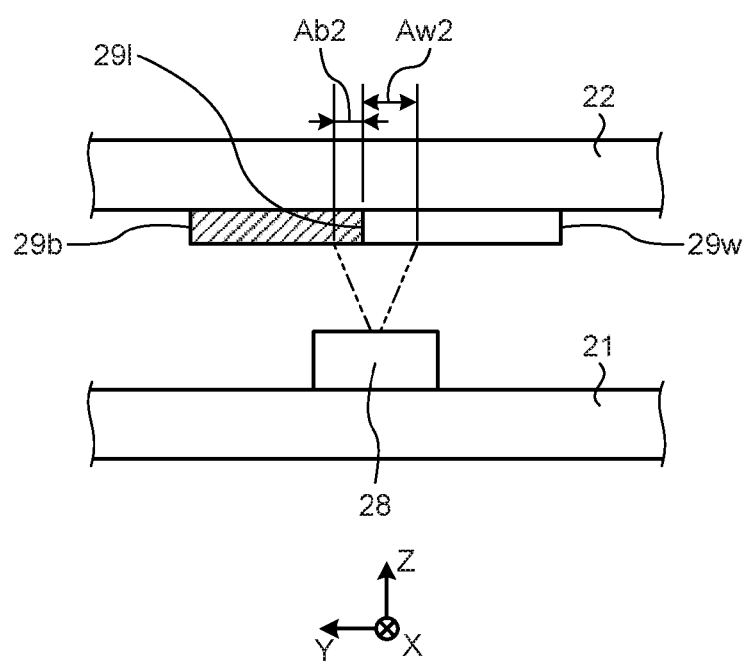
FIG. 10 is a view on arrow C of FIG. 9.

FIG. 9 is a schematic view illustrating a case where moment about the Z axis is applied to the force sensor according to the present embodiment. FIG. 10 is a view on arrow C of FIG. 9. Moment Mz about the Z axis is a second force component that causes the second movable portion 22 to rotate. The second movable portion 22 rotates about the Z axis when the moment Mz about the Z axis is applied to the force sensor 1. As the second movable portion 22 rotates about the Z axis, the position of the reflector 29 relative to the second sensor 28 changes. Therefore, as illustrated in FIG. 10, a region Aw2 irradiated with light in the high reflectance region 29w becomes larger than a region Ab2 irradiated with light in the low reflectance region 29b. Since the high reflectance region 29w has a higher light reflectance than the low reflectance region 29b, the light receiving part of the second sensor 28 detects higher reflected-light intensity. The force sensor 1 detects the magnitude and direction of the applied moment Mz about the Z axis on the basis of a change in the reflected-light intensity.

Note that when moment about the Z axis is applied to the force sensor 1 in a direction opposite to the direction described above, a region irradiated with light in the high reflectance region 29w becomes smaller than a region irradiated with light in the low reflectance region 29b. Since the low reflectance region 29b has a lower light reflectance than the high reflectance region 29w, the light receiving part of the second sensor 28 detects lower reflected-light intensity.

Figure 11:
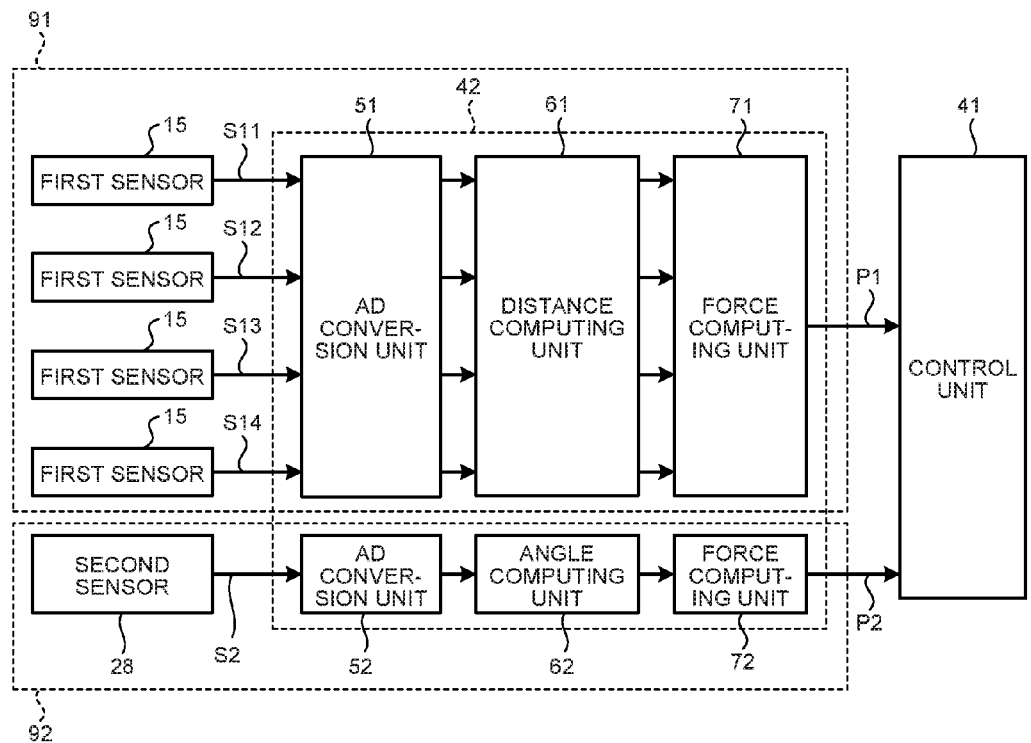
FIG. 11 is a schematic diagram illustrating a configuration of a first detection unit and a second detection unit according to the present embodiment.

FIG. 11 is a schematic diagram illustrating a configuration of a first detection unit and a second detection unit according to the present embodiment. The force sensor 1 includes a first detection unit 91 and a second detection unit 92. The first detection unit 91 and the second detection unit 92 are connected to a control unit 41 of a rotary machine such as a motor. The first detection unit 91 and the second detection unit 92 output external force data P1 and P2 to the control unit 41, the external force data being information on external force applied to the force sensor 1. The first detection unit 91 includes the first sensors 15, an AD conversion unit 51, a distance computing unit 61, and a force computing unit 71. The second detection unit 92 includes the second sensor 28, an AD conversion unit 52, an angle computing unit 62, and a force computing unit 72. The four first sensors 15 transmit sensor outputs S11, S12, S13, and S14, respectively, to the AD conversion unit 51 according to the reflected-light intensity detected by each sensor. The second sensor 28 transmits a sensor output S2 to the AD conversion unit 52 according to the detected reflected-light intensity. The AD conversion units 51 and 52, the distance computing unit 61, the angle computing unit 62, and the force computing units 71 and 72 are included in a single arithmetic processing unit 42, for example. Note that the AD conversion unit 51, the distance computing unit 61 and the force computing unit 71 may be included in one arithmetic processing unit, and the AD conversion unit 52, the angle computing unit 62, and the force computing unit 72 may be included in another arithmetic processing unit.

Figure 12:
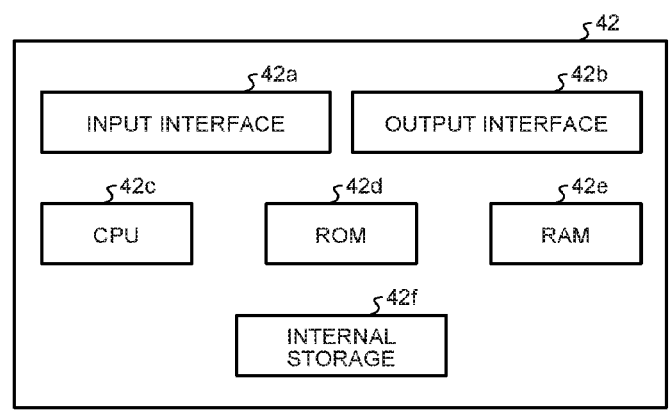
FIG. 12 is a block diagram illustrating an arithmetic processing unit according to the present embodiment.

FIG. 12 is a block diagram illustrating the arithmetic processing unit according to the present embodiment. The arithmetic processing unit 42 is a computer such as a microcomputer (micon) and includes an input interface 42a, an output interface 42b, a Central Processing Unit (CPU) 42c, a Read Only Memory (ROM) 42d, a Random Access Memory (RAM) 42e, and an internal storage 42f. The input interface 42a, the output interface 42b, the CPU 42c, the ROM 42d, the RAM 42e, and the internal storage 42f are connected to an internal bus.

The input interface 42a receives the sensor outputs S11, S12, S13, and S14 from the first sensors 15 as well as the sensor output S2 from the second sensor 28 and outputs them to the CPU 42c. The output interface 42b receives the external force data P1 and P2 from the CPU 42c and outputs them to the control unit 41.

The ROM 42d stores a program such as a Basic Input/Output System (BIOS). The internal storage 42f is a Hard Disk Drive (HDD) or a flash memory, for example, and stores an operating system program and an application program. The CPU 42c implements various functions by executing the programs stored in the ROM 42d and/or the internal storage 42f while using the RAM 42e as a work area.

The internal storage 42f stores a distance database in which each of the four sensor outputs S11, S12, S13 and S14 is associated with the distance from each of the four the first sensors 15 to the corresponding reflector 16, and an angle database in which the sensor output S2 is associated with the angle of rotation of the second movable portion 22 relative to the first movable portion 21. The internal storage 42f also stores a first force-component database in which the distance from each of the four first sensors 15 to the corresponding reflector 16 is associated with the magnitude and direction of the first force component, and a second force component database in which the angle of rotation of the second movable portion 22 relative to the first movable portion 21 is associated with the magnitude and direction of the second force component.

The AD conversion units 51 and 52 use the input interface 42a to convert the sensor outputs S11, S12, S13, S14, and S2 being analog data into digital data. The distance computing unit 61 performs arithmetic processing of deriving the distance from each of the four first sensors 15 to the corresponding reflector 16 by providing the sensor outputs S11, S12, S13, and S14 to the distance database stored in the internal storage 42f while the CPU 42c uses the RAM 42e as the work area for temporary storage. The angle computing unit 62 performs arithmetic processing of deriving the angle of rotation of the second movable portion 22 relative to the first movable portion 21 by providing the sensor output S2 to the angle database stored in the internal storage 42f while the CPU 42c uses the RAM 42e as the work area for temporary storage. The force computing unit 71 performs arithmetic processing of deriving the magnitude and direction of the first force component by providing the output of the distance computing unit 61 to the first force-component database stored in the internal storage 42f while the CPU 42c uses the RAM 42e as the work area for temporary storage. The force computing unit 72 performs arithmetic processing of deriving the magnitude and direction of the second force component by providing the output of the angle computing unit 62 to the second force-component database stored in the internal storage 42f while the CPU 42c uses the RAM 42e as the work area for temporary storage. Moreover, the force computing units 71 and 72 output the external force data P1 and P2 to the control unit 41 through the output interface 42b. The external force data P1 is data representing the magnitude and direction of external force that causes the first movable portion 21 and the second movable portion 22 to rock. The external force data P2 is data representing the magnitude and direction of external force that causes the second movable portion 22 to rotate.

The force sensor 1 can detect the moment My illustrated in FIG. 6 by using the first detection unit 91, the moment My being the first force component that causes the first movable portion 21 and the second movable portion 22 to rock. When the moment My is applied to the force sensor 1, the distance Dz1 illustrated in FIG. 6 becomes larger than the distance Dz, so that the first sensor 15 separated from the corresponding reflector 16 by the distance Dz1 detects a reflected-light intensity lower than a reflected-light intensity detected when no external force is applied to the force sensor 1. The sensor output S11 of the first sensor 15 is decreased as a result. On the other hand, the distance Dz2 illustrated in FIG. 6 becomes smaller than the distance Dz, so that the first sensor 15 separated from the corresponding reflector 16 by the distance Dz2 detects a reflected-light intensity higher than a reflected-light intensity detected when no external force is applied to the force sensor 1. The sensor output S12 of the first sensor 15 is increased as a result. The two sensor outputs S11 and S12 are then transmitted from the two first sensors 15 arranged on the straight line parallel to the X axis to the AD conversion unit 51.

The two sensor outputs S11 and S12 are converted from analog data to digital data by the AD conversion unit 51 and transmitted to the distance computing unit 61. The distance computing unit 61 provides the two sensor outputs S11 and S12, which have been converted to digital date, to the distance database, obtains data on the distances Dz1 and Dz2, and then transmits the data on the distances Dz1 and Dz2 to the force computing unit 71. The force computing unit 71 provides the data on the distances Dz1 and Dz2 to the first force-component database in which a difference between the distance Dz1 and the distance Dz2 is associated with the magnitude and direction of the moment My, obtains data on the moment My, and transmits the data on the magnitude and direction of the moment My as the external force data P1 to the control unit 41. According to the method described above, the force sensor 1 can detect the moment My by using the first detection unit 91. Note that when the moment about the X axis is applied to the force sensor 1, the moment can be detected by the similar method on the basis of the sensor outputs S13 and S14 of the two first sensors 15 arranged on the straight line parallel to the Y axis.

The force sensor 1 can detect the moment Mz illustrated in FIG. 9 by using the second detection unit 92, the moment being the second force component that causes the second movable portion 22 to rotate. When the moment Mz is applied to the force sensor 1, the position of the reflector 29 relative to the second sensor 28 changes as the second movable portion 22 rotates about the Z axis. Accordingly, the reflected-light intensity detected by the light receiving part of the second sensor 28 changes. The sensor output S2 of the second sensor 28 changes as a result. The sensor output S2 is transmitted to the AD conversion unit 52.

The sensor output S2 is converted from analog data to digital data by the AD conversion unit 52 and transmitted to the angle computing unit 62. The angle computing unit 62 provides the sensor output S2, which has been converted to digital data, to the angle database, obtains data on the angle of rotation of the second movable portion 22 relative to the first movable portion 21, and then transmits the data on the relative angle of rotation to the force computing unit 72. The force computing unit 72 provides the data on the relative angle of rotation to the second force-component database in which the angle of rotation of the second movable portion 22 relative to the first movable portion 21 is associated with the magnitude and direction of the moment Mz, obtains data on the moment Mz, and then transmits the data on the moment Mz as the external force data P2 to the control unit 41. According to the method described above, the force sensor 1 can detect the moment Mz by using the second detection unit 92.

Therefore, when the first force component causing the first movable portion 21 and the second movable portion 22 to rock is applied to the force sensor 1, the force sensor 1 can detect the first force component by using the first detection unit 91 that performs the computation based on the displacement of the first movable portion 21 and the second movable portion 22 relative to the base 10. Moreover, when the second force component causing the second movable portion 22 to rotate is applied, the force sensor 1 can detect the second force component by using the second detection unit 92 that performs the computation based on the displacement of the second movable portion 22 relative to the first movable portion 21. That is, the force sensor 1 can detect the moment about the X axis and Y axis by using the first detection unit 91 and detect the moment about the Z axis by using the second detection unit 92.

When the external force is applied to the force sensor 1, the sensor outputs S11, S12, S13, and S14 have information on the first force component causing the first movable portion 21 and the second movable portion 22 to rock. On the other hand, the sensor output S2 has information on the second force component causing the second movable portion 22 to rotate. The sensor outputs S11, S12, S13 and S14 and the sensor output S2 thus have the information on the force components acting in mutually different directions among the multi-directional force components included in the same external force. Accordingly, each of the sensor outputs S11, S12, S13, and S14 and the sensor output S2 has less information on the direction of the force component than that of a conventional technology. The force sensor 1 detects the first force component and the second force component acting in the mutually different directions by individually performing computation on each of the sensor outputs S11, S12, S13, and S14 and the sensor output S2 that have the information on the force components acting in the mutually different directions. As a result, the force sensor 1 can improve detection responsiveness by facilitating the arithmetic processing performed to detect external force.

As described above, the force sensor 1 according to the present embodiment includes the base 10, the first movable portion 21 arranged to face the base 10, the support 30 provided on the base 10 to rockably support the first movable portion 21, and the first detection unit 91 that can separately detect the force components acting in two directions and causing the first movable portion 21 to rock when external force is applied to the first movable portion 21.

Accordingly, when external force is applied to the force sensor 1, the first detection unit 91 separately processes the pieces of information on the respective force components acting in the two directions among the multi-directional force components included in the external force. The first detection unit 91 therefore processes less information on the direction of the force component than that of the conventional technology. As a result, the force sensor 1 can improve detection responsiveness by facilitating the arithmetic processing performed to detect the external force.

Moreover, the force sensor 1 according to the present embodiment includes the base 10, the first movable portion 21 arranged to face the base 10, the second movable portion 22 arranged to face the first movable portion 21, the support 30 provided on the base 10 to rockably support the first movable portion 21 and the second movable portion 22, and the joint 2 provided to the support 30 to rotatably support the second movable portion 22. The force sensor 1 further includes the first detection unit 91 capable of detecting external force that causes the first movable portion 21 and the second movable portion 22 to rock and the second detection unit 92 capable of detecting external force that causes the second movable portion 22 to rotate when external force is applied to at least one of the first movable portion 21 and the second movable portion 22.

Accordingly, when external force is applied to the force sensor 1, the first detection unit 91 processes the information on the first force component causing the first movable portion 21 and the second movable portion 22 to rock. The second detection unit 92 processes the information on the second force component causing the second movable portion 22 to rotate. The first detection unit 91 and the second detection unit 92 thus process the pieces information on the respective force components acting in the mutually different directions among the multi-directional force components included in the same external force. Each of the first detection unit 91 and the second detection unit 92 therefore processes less information on the direction of the force component than that of the conventional technology. The force sensor 1 thus detects the first force component and the second force component acting in the mutually different directions with the first detection unit 91 and the second detection unit 92 that process the pieces information on the respective force components acting in the mutually different directions. As a result, the force sensor 1 can improve detection responsiveness by facilitating the arithmetic processing performed to detect the external force.

Moreover, in the force sensor 1 according to the present embodiment, the first movable portion 21 and the second movable portion 22 are arranged above the base 10 in the vertical direction. The load applied to the joint 2 supporting the second movable portion 22 thus mainly corresponds to the weight of the second movable portion 22 and the external force. Therefore, the load applied to the joint 2 supporting the second movable portion 22 is smaller than a load when the first movable portion 21 and the second movable portion 22 are arranged below the base 10 in the vertical direction. Therefore, the force sensor 1 according to the present embodiment can prevent possible breakage of the joint 2 by decreasing the load applied to the joint 2 that supports the second movable portion 22.

Moreover, according to the force sensor 1 of the present embodiment, the first detection unit 91 includes three or more of the first sensors 15 capable of emitting light and detecting reflected light of the light. The first sensor 15 can thus radiate light to the first movable portion 21 and detect the reflected-light intensity of the light. The force sensor 1 therefore does not require high-precision positioning as required when the light emitting part and the light receiving part are arranged to face each other. As a result, the force sensor 1 can prevent degradation in the detection precision resulting from the arrangement of the first sensor 15.

Moreover, in the force sensor 1 according to the present embodiment, the first detection unit 91 includes the four first sensors 15 where two of the four first sensors 15 are arranged on the same straight line parallel to the X axis, and the remaining two of the first sensors 15 are arranged on the same straight line parallel to the Y axis. Accordingly, the force sensor 1 can detect the moment about the Y axis on the basis of the sensor outputs S11 and S12 of the two first sensors 15 arranged on the same straight line parallel to the X axis and detect the moment about the X axis on the basis of the sensor outputs S13 and S14 of the two first sensors 15 arranged on the same straight line parallel to the Y axis. As a result, the force sensor 1 can further facilitate the arithmetic processing performed to detect external force.

Moreover, in the force sensor 1 according to the present embodiment, the first detection unit 91 includes three or more of the first sensors 15 that are provided on the top surface of the base 10 and are capable of emitting light and obtaining the distance to a detection target by detecting reflected light of the light, where the first detection unit 91 detects the angle of inclination of the first movable portion 21 by using the position of each first sensor 15 and the distance to the detection target. Each of the first sensors 15 can thus radiate light to the corresponding reflector 16 stuck to the first movable portion 21 and detect the reflected-light intensity of the light. The first detection unit 91 radiates the light toward the reflectors 16 having a flat portion with a relatively large area. Accordingly, the force sensor 1 according to the present embodiment does not require high-precision positioning as required when the light emitting part and the light receiving part are provided separately and arranged to face each other. As a result, the force sensor 1 according to the present embodiment can prevent degradation in the detection precision resulting from the arrangement of the first sensors 15.

Note that the force sensor 1 may include an elastic body such as a coil spring instead of the permanent magnets 24 and 25. When the force sensor 1 includes the coil spring, for example, it is simply necessary that one end of the coil spring is fixed to the first movable portion 21, and that the other end of the spring is fixed to the second movable portion 22. Accordingly, when the angle of rotation of the second movable portion 22 relative to the first movable portion 21 changes, the coil spring expands/contracts to generate elastic force so that the relative angle of rotation is regulated.

Moreover, the reflectors 16 need only have uniform reflectance of light and have no restriction on its material, surface property, color or the like. No reflector 16 is necessary when the reflectance of the surface of the first movable portion 21 on the side of the base 10 is uniform.

Moreover, the reflector 29 may include a diffusion region diffusing light in multiple directions and a retroreflective region reflecting light in its incident direction instead of the high reflectance region 29w and the low reflectance region 29b. A reflectance of light in the retroreflective region is higher than a reflectance of light in the diffusion region, so that the reflected-light intensity detected by the second sensor 28 changes when the moment about the Z axis is applied to the force sensor 1. Alternatively, the reflector 29 may include a gradation region having gradually varying reflectances in a circumferential direction about the Z axis, instead of the high reflectance region 29w and the low reflectance region 29b.

Moreover, the second movable portion 22 may include an incline instead of the reflector 29, the incline being formed by gradually protruding or recessing a part of the surface of the second movable portion 22 facing the first movable portion 21. In such case, a distance between the second sensor 28 and the incline changes when the moment about the Z axis is applied to the force sensor 1, whereby the reflected-light intensity detected by the second sensor 28 changes.

Each of the first sensors 15 does not necessarily have to be a photo-reflector but need only be one capable of detecting the distance from each of the first sensors 15 to the corresponding reflector 16. The first sensor 15 may be an ultrasonic sensor or a capacitive sensor, for example. The first sensor 15 may also be an acceleration sensor fixed to each of the base 10 and the first movable portion 21. In such case, the first detection unit 91 may compute the angle of inclination of the first movable portion 21 with respect to the base 10 on the basis of a difference between outputs of the acceleration sensor fixed to the base 10 and the acceleration sensor fixed to the first movable portion 21, and detect the distance from each of the first sensors 15 to the corresponding reflector 16 on the basis of the angle of inclination. The force sensor 1 may also include a first sensor 15 in which the photo-reflector and the acceleration sensor are combined, for example.

Moreover, in the present embodiment, the first detection unit 91 does not necessarily have to include the four first sensors 15. The first detection unit 91 need only include at least three or more of the first sensors 15.

The present embodiment relates to the arrangement of the sensors in the force sensor 1 capable of detecting external force.

The inventions described in Patent Literatures 1 and 2 require precise positioning of a light emitting element and a light receiving element since the two elements are arranged to face each other. Moreover, the structure in the aforementioned prior art is highly rigid so that a displacement caused by external force is very small (up to about 100 µm). In order to accurately detect such infinitesimal displacement, an S/N ratio of the sensor output needs to be increased, and mature deliberation is required in complex filter processing and an amplifier circuit design.

On the other hand, according to the force sensor 1 of the present embodiment, each reflector 16 with the relatively large flat portion is directly irradiated with light for measuring the displacement to detect the reflected light and measure the amount of displacement of the movable portion, so that the positioning of the light emitting element and the light receiving element is made easy. Moreover, with the present structure, the movable portion is displaced up to about several millimeters. Therefore, a sensor output larger than normal can be obtained when such displacement is detected. As a result, a filter circuit and an amplifier circuit smaller than normal can be made, and a satisfactory S/N ratio can be obtained.

The present embodiment relates to the stopper regulating a stroke of the force sensor 1 capable of detecting the external force.

Patent Literatures 1, 2, and 3 do not disclose a method or structure of protecting the force sensor when excessive external force is applied thereto. It is therefore possible for the sensor to break when excessive external force acts on the force sensor.

On the other hand, the present embodiment includes the stopper preventing the breakage of the sensor even when excessive external force acts on the force sensor 1.

The force sensor 1 according to the present embodiment includes the stopper that regulates a movable range of the first movable portion 21 and the second movable portion 22. The respective stoppers 19 regulating the movable range of the first movable portion 21 are arranged at three or four positions so that the three or four first movable portions 21 are evenly spaced in the circumferential direction about the Z axis as the center and protrude in the Z-axis direction from the base 10. Each of the stopper 19 has the length so as to come into contact with the first movable portion 21 when the first movable portion 21 is overly inclined, whereby the breakage of the sensor can be prevented even when excessive moment acts on the force sensor 1.

Moreover, the stoppers 26 and 27 regulating the movable range of the second movable portion 22 are provided on the opposing surfaces of the first movable portion 21 and the second movable portion 22, respectively, and mounted such that the stoppers 26 and 27 collide with each other when the second movable portion 22 is overly moved.

According to the preset embodiment, there can be provided the force sensor 1 that can improve detection responsiveness by facilitating the arithmetic processing performed to detect external force. Moreover, excessive movement of the first movable portion 21 and the second movable portion 22 as well as the breakage of the force sensor 1 can be prevented even when large external force acts on the sensor.

(First Variation)

Figure 13:
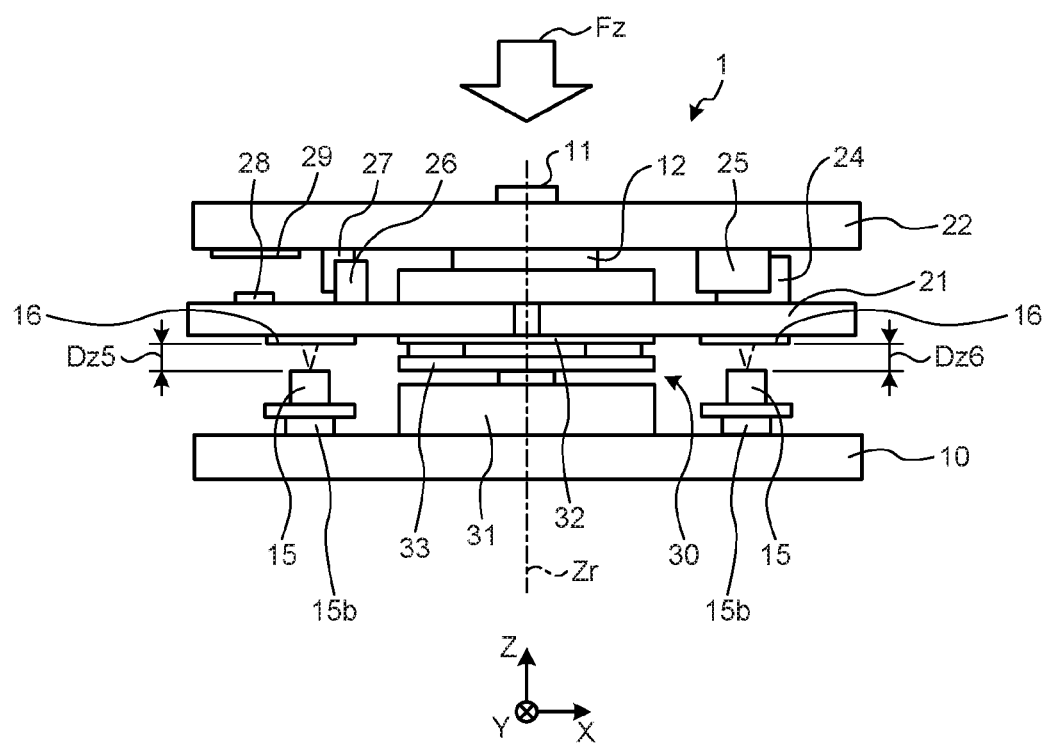
FIG. 13 is a schematic view illustrating a force sensor according to a first variation.

FIG. 13 is a schematic view illustrating a force sensor according to a first variation. A force sensor 1 according to the first variation can detect external force that causes a parallel movement of a first movable portion 21 toward a base 10. The external force causing the parallel movement of the first movable portion 21 toward the base 10 is axial force Fz applied parallel to a Z axis illustrated in FIG. 13. Note that a component that is the same as the one described in the aforementioned embodiment is assigned the same reference numeral as that assigned to the one in the aforementioned embodiment to omit redundant description.

When the axial force Fz parallel to the Z axis is applied to the force sensor 1, a disc 33 being a plate spring included in a support 30 is deformed so as to contract evenly in a Z-axis direction as a whole. Accordingly, the first movable portion 21 fixed to an upper fixture 32 of the support 30 moves in the Z-axis direction while maintaining a parallel state with the base 10, namely the entire first movable portion 21 evenly moves in the Z-axis direction. As a result, a distance between each of four first sensors 15 and a corresponding reflector 16 facing each of the first sensors 15 becomes smaller than the distance Dz illustrated in FIG. 1. That is, as illustrated in FIG. 13, distances Dz5 and Dz6 between two of the first sensors 15 arranged on a straight line parallel to an X axis and the respective reflectors 16 facing the two first sensors 15 are both smaller than the distance Dz. Moreover, distances Dz7 and Dz8 between two of the first sensors 15 arranged on a straight line parallel to a Y axis and the respective reflectors 16 facing the first sensors 15 are both smaller than the distance Dz.

As described above, a reflected-light intensity detected by each of the first sensors 15 changes depending on the distance from each of the first sensors 15 to the corresponding reflector 16 and a reflectance of the corresponding reflector 16. The reflectance of each of the reflectors 16 is fixed. Accordingly, when the axial force Fz parallel to the Z axis is applied to the force sensor 1, the reflected-light intensities detected by the four first sensors 15 are increased uniformly. A first detection unit 91 of the force sensor 1 in the first variation determines that the axial force Fz parallel to the Z axis is being applied on the basis of the uniform increase in the reflected-light intensity detected by the four first sensors 15, and can detect the magnitude of the axial force Fz by obtaining an average value of the distances Dz5, Dz6, Dz7 and Dz8, for example.

A distance computing unit 61 of the first variation computes four outputs on the basis of sensor outputs S11, S12, S13 and S14 of the four first sensors 15. Moreover, an internal storage 42f of the first variation stores an axial force database in which the average value of the distances Dz5, Dz6, Dz7 and Dz8 is associated with the magnitude of the axial force Fz. When the distance computing unit 61 outputs the four outputs indicating the respective distances that are all smaller than the distance Dz, a force computing unit 71 of the first variation provides the average value of the outputs of the distance computing unit 61 to the axial force database stored in the internal storage 42f and performs arithmetic processing to derive the magnitude of the axial force Fz. The force computing unit 71 then outputs external force data P1 indicating the axial force parallel to the Z axis to a control unit 41. Therefore, the force sensor 1 according to the first variation can detect the axial force Fz applied to the force sensor 1.

(Second Variation)

Figure 14:
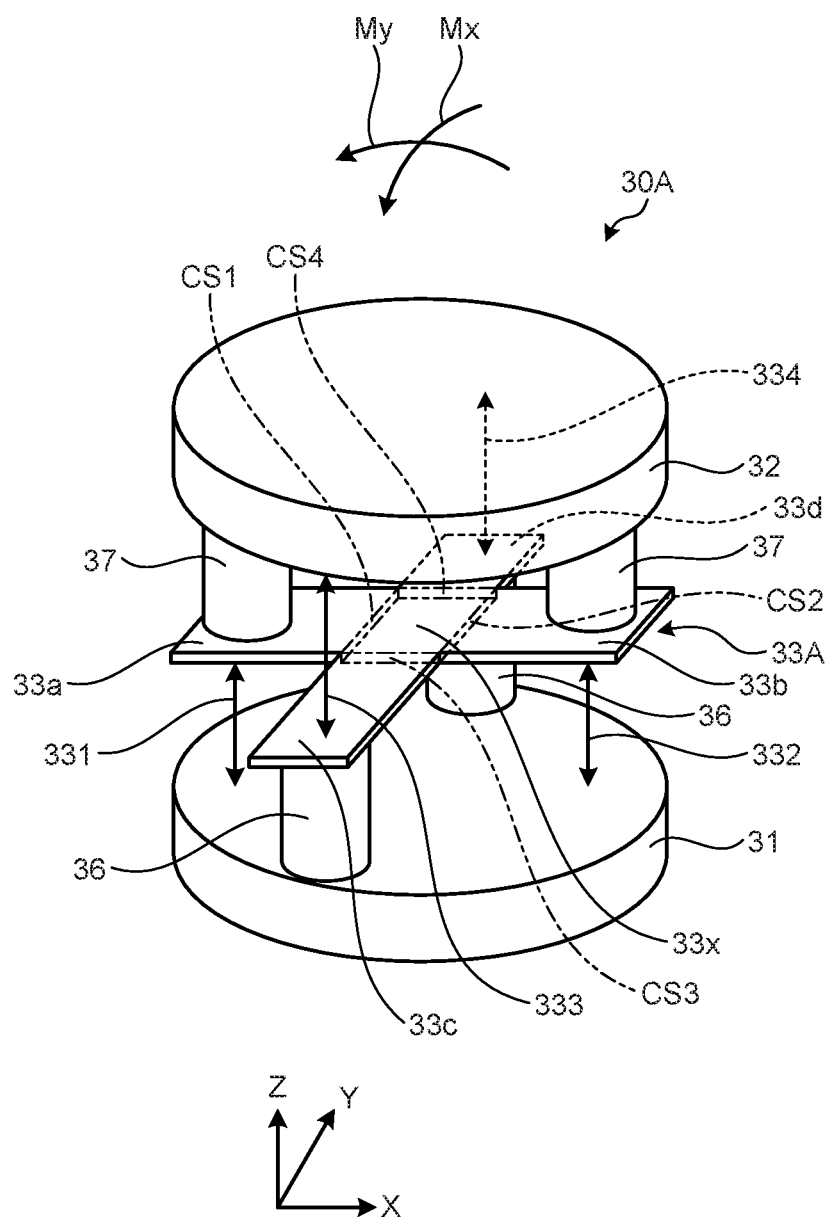
FIG. 14 is a perspective view illustrating a configuration of a support according to a second variation.
Figure 15:
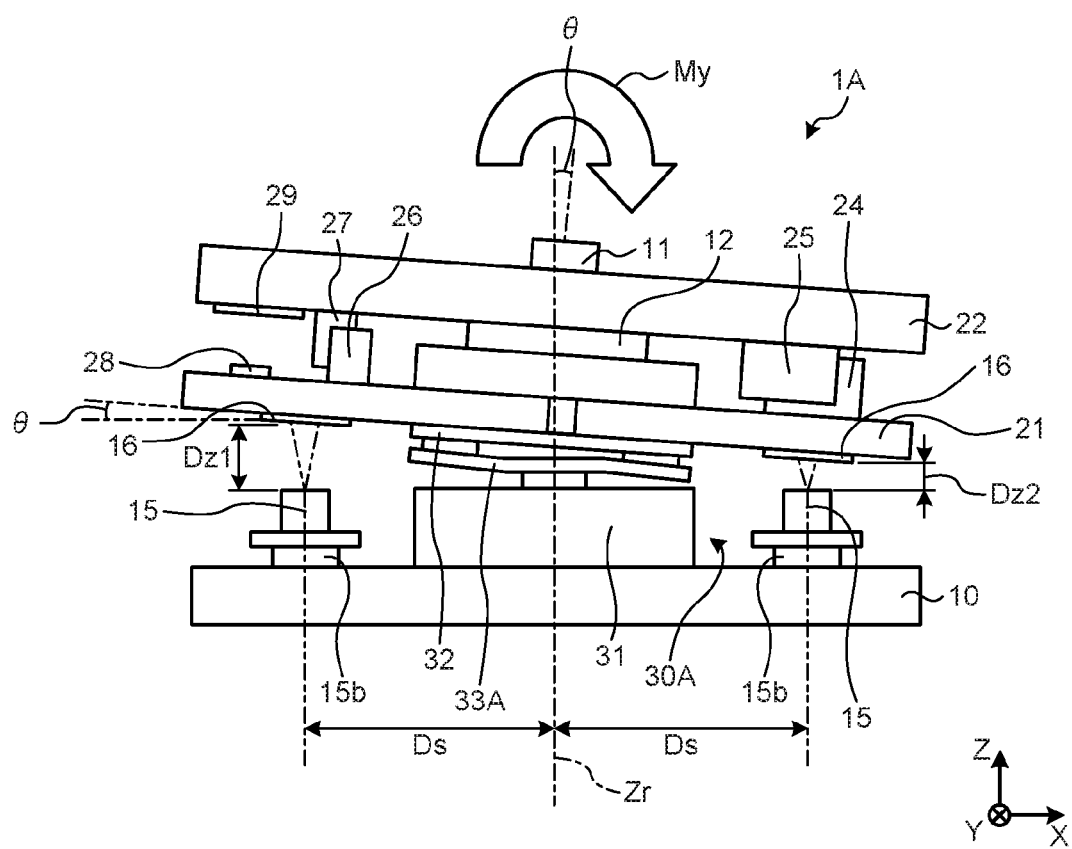
FIG. 15 is a schematic view illustrating a case in which moment about a Y axis is applied to a force sensor according to the second variation.

FIG. 14 is a perspective view illustrating a configuration of a support according to a second variation. FIG. 15 is a schematic view illustrating a case in which moment about a Y axis is applied to a force sensor according to the second variation. A support 30A according to the second variation includes a lower fixture 31, an upper fixture 32, and a plate spring portion 33A. Note that a component that is the same as the one described in the aforementioned embodiment is assigned the same reference numeral as that assigned to the one in the aforementioned embodiment to omit redundant description.

As illustrated in FIG. 14, the plate spring portion 33A is cruciform in shape when viewed in a Z-axis direction, for example, and is a plate-like member parallel to the lower fixture 31 and the upper fixture 32. The plate spring portion 33A includes a base portion 33x and protrusions 33a, 33b, 33c and 33d protruding from the base portion 33x. The protrusions 33a and 33b protrude in an X-axis direction from the base portion 33x, whereas the protrusions 33c and 33d protrude in a Y-axis direction from the base portion 33x. The respective spacers 37 are in contact with surfaces of the protrusions 33a and 33b facing the upper fixture 32. Each of the spacers 37 is a member that is provided to create a gap between the upper fixture 32 and the plate spring portion 33A and can move together with the upper fixture 32 when the upper fixture 32 is displaced. The respective spacers 36 are in contact with surfaces of the protrusions 33c and 33d facing the lower fixture 31. Each of the spacers 36 is a member provided to create a gap between the lower fixture 31 and the plate spring portion 33A. The plate spring portion 33A is thus supported by the lower fixture 31 through the two spacers 36, while the upper fixture 32 is supported by the plate spring portion 33A through the two spacers 37. Note that the base portion 33x and the protrusions 33a, 33b, 33c, and 33d may be formed either integrally or separately. Moreover, a plurality of the plate spring portion 33A may be provided, and a plurality of the spacers 36 and 37 may be arranged on the surface of each of the protrusions 33a, 33b, 33c and 33d.

When no external force is applied to the upper fixture 32, the plate spring portion 33A is parallel to the lower fixture 31 and the upper fixture 32, so that a distance 331 from the lower fixture 31 to the protrusion 33a is equal to a distance 332 from the lower fixture 31 to the protrusion 33b, and so that a distance 333 from the protrusion 33c to the upper fixture 32 is equal to a distance 334 from the protrusion 33d to the upper fixture 32. When external force is applied to the upper fixture 32, on the other hand, a part of each of the protrusions 33a, 33b, 33c, and 33d closer to the base portion 33x relative to the position in contact with the spacer 36 or 37 undergoes elastic deformation depending on a displacement of the upper fixture 32. Specifically, when moment My about the Y axis is applied to the upper fixture 32, a part of the protrusion 33a closer to the spacer 37 relative to a virtual cross section CS1 at the base of the protrusion undergoes deformation to be lowered in the Z-axis direction, while a part of the protrusion 33b closer to the spacer 37 relative to a virtual cross section CS2 at the base of the protrusion undergoes deformation to be raised in the Z-axis direction. The protrusions 33a and 33b are thus inclined with respect to the lower fixture 31, thereby causing the distance 331 to be smaller than the distance 332. The upper fixture 32 is inclined as a result. Moreover, when moment Mx about the X axis is applied to the plate spring portion 33A, the protrusion 33c undergoes deformation to cause a virtual cross section CS3 at the base of the protrusion 33c to be lowered in the Z-axis direction, while the protrusion 33d undergoes deformation to cause a virtual cross section CS4 at the base of the protrusion 33d to be raised in the Z-axis direction. The protrusions 33c and 33d are thus inclined with respect to the lower fixture 31. As a result, the upper fixture 32 is inclined to cause the distance 333 to be smaller than the distance 334. Therefore, when the external force is applied to a force sensor 1A, the upper fixture 32 can be tilted according to the deformation of the plate spring portion 33A.

Note that when external force causing a parallel movement of a first movable portion 21 toward a base 10 is applied to the force sensor 1A as described in first variation, the protrusions 33a and 33b undergo deformation to be evenly lowered in the Z-axis direction. Accordingly, the first movable portion 21 fixed to the upper fixture 32 of the support 30A moves in the Z-axis direction while maintaining a parallel state with the base 10.

As described above, the support 30A in the force sensor 1A according to the second variation includes the lower fixture 31 supported by the base 10, the plate spring portion 33A having a plate-like shape and supported by the lower fixture 31 through the spacer 36 to be able to undergo elastic deformation, and the upper fixture 32 supported by the plate spring portion 33A through the spacer 37. The plate spring portion 33A includes the plate-like base portion 33x and the plurality of protrusions 33a, 33b, 33c and 33d. The protrusions 33a, 33b, 33c and 33d are on the same plane as the base portion 33x and protrude from the base portion 33x. The surfaces of the protrusions 33a, 33b, 33c and 33d are in contact with the spacers 36 and 37. When external force is applied to the first movable portion 21, a part of each of the protrusions 33a, 33b, 33c, and 33d closer to the base portion 33x relative to the respective positions in contact with the spacers 36 and 37 undergoes deformation according to a displacement of the first movable portion 21. The external force applied to the first movable portion 21 thus propagates to the plate spring portion 33A through the spacer 37 and causes the protrusions 33a, 33b, 33c and 33d to undergo elastic deformation. Accordingly, the force sensor 1A can prevent wobbling in an operation that causes the first movable portion 21 to rock when external force is applied to the first movable portion 21 and causes the first movable portion 21 to be restored to an original position when the external force is removed. As a result, the force sensor 1A can prevent degradation in the precision of detecting external force resulting from the wobbling.

Moreover, the support 30A in the force sensor 1A of the second variation includes a plurality of plate spring portions 33A connected to face one another with spacing formed thereamong. The plate spring portions 33A are connected to face one another with spacing formed thereamong by, for example, being stacked in the Z-axis direction through the spacer arranged at each of the protrusions 33a and 33b or the protrusions 33c and 33d in each plate spring portion 33A. This allows each of the plate spring portions 33A to undergo deformation when the external force causing the parallel movement of the first movable portion 21 toward the base 10 is applied to the force sensor 1A as described in the first variation. Therefore, as the number of the plate spring portions 33A increases, the amount of parallel movement of the first movable portion 21 toward the base 10 increases. The force sensor 1A can thus adjust the amount of movement of the first movable portion 21 when the external force causing the parallel movement of the first movable portion 21 toward the base 10 is applied. Moreover, the force sensor 1A is possibly operated by receiving external force directly from an operator being a human. The force sensor 1A can thus make the operator perceive the movement of the first movable portion 21 more easily and improve operability when the operator applies the external force causing the parallel movement of the first movable portion 21 toward the base 10.

(Third Variation)

Figure 16:
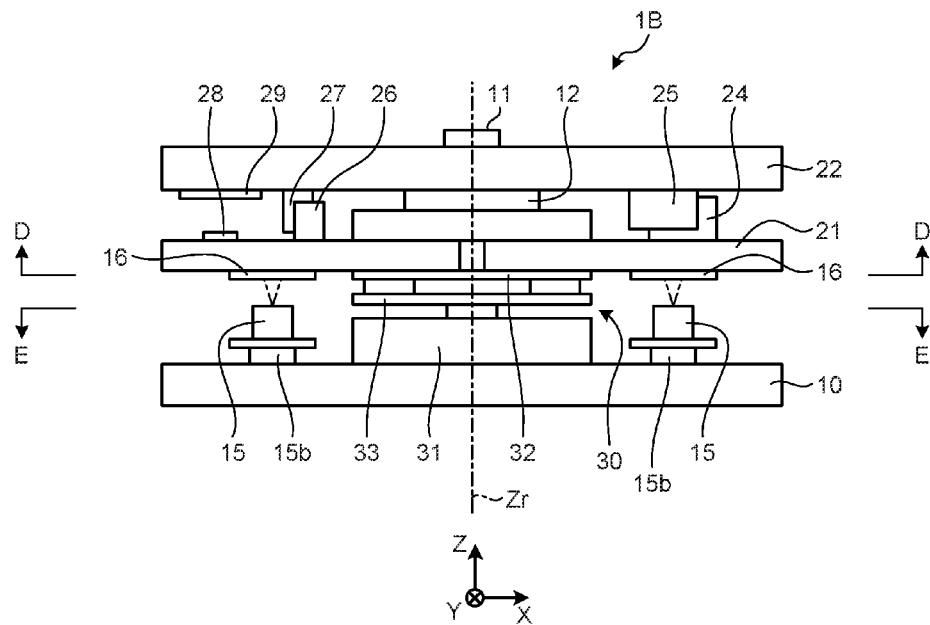
FIG. 16 is a schematic view illustrating a force sensor according to a third variation.
Figure 17:
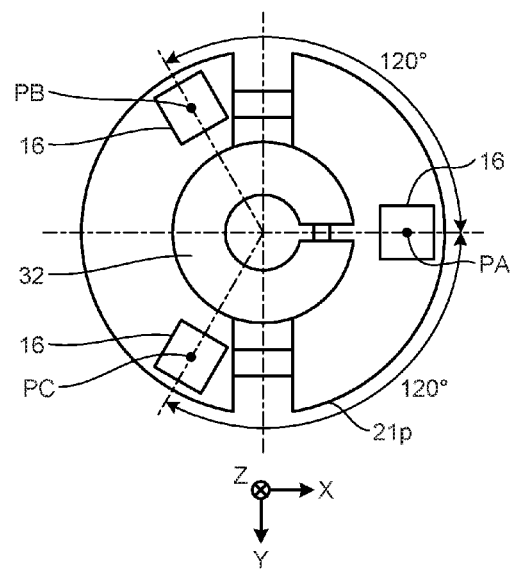
FIG. 17 is a schematic view illustrating a cross section taken along line D-D of FIG. 16.
Figure 18:
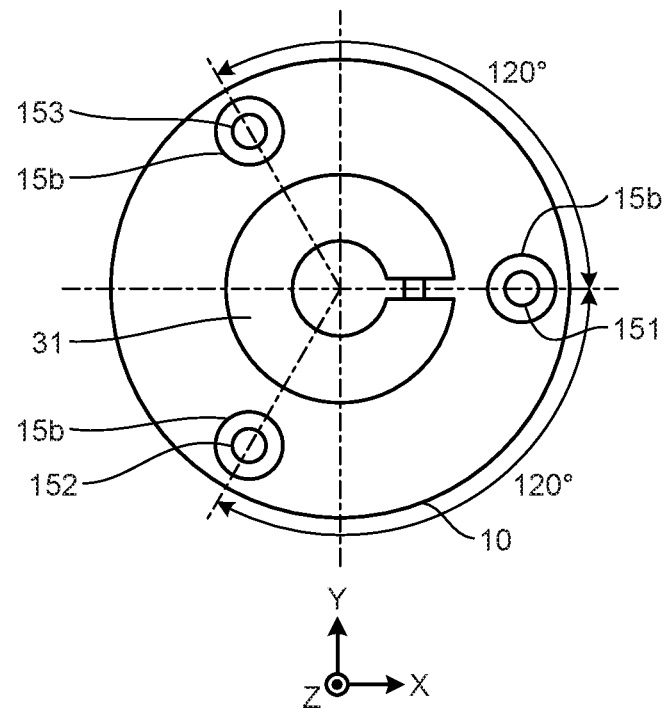
FIG. 18 is a schematic view illustrating a cross section taken along line E-E of FIG. 16.

FIG. 16 is a schematic view illustrating a force sensor according to a third variation. FIG. 17 is a schematic view illustrating a cross section taken along line D-D of FIG. 16. FIG. 18 is a schematic view illustrating a cross section taken along line E-E of FIG. 16. Note that a component that is the same as the one described in the aforementioned embodiment is assigned the same reference numeral as that assigned to the one in the aforementioned embodiment to omit redundant description.

According to a force sensor 1B of the third variation, a first detection unit 91 includes at least three or more first sensors 15. FIGS. 16 to 18 illustrate the force sensor 1B according to the third variation where the three first sensors 15 are arranged at approximately equal intervals in a circumferential direction. With three or more of the first sensors 15, the force sensor 1B can determine an angle of inclination of a first movable portion 21.

As illustrated in FIG. 18, it is assumed that first sensors 151, 152 and 153 correspond to the three first sensors 15 and have coordinates (x151, y151), (x152, y152), and (x153, y153) on an X-Y plane, respectively. When output of each of the three first sensors 151, 152 and 153 is set to zero while no external force is applied to the force sensor 1B, as illustrated in FIG. 17, the coordinates of the first movable portion 21 at points PA, PB, and PC measured by the first sensors 15 are (x151, y151, 0), (x152, y152, 0), and (x153, y153, 0) in an X-Y-Z coordinate system, respectively.

When external force is applied to the force sensor 1B, the first movable portion 21 is inclined so that the output of each of the three first sensors 151, 152 and 153 changes. As a result, the coordinates of the points PA, PB and PC shift to (x151, y151, z151), (x152, y152, z152), and (x153, y153, z153), respectively. Here, a vector from the point PA to the point PB in expression (1) is expressed by expression (2). A vector from the point PA to the point PC in expression (3) is expressed by expression (4). Therefore, a normal vector H of a plane including the points PA, PB and PC in the first movable portion 21 can be expressed by a cross product of the two vectors as in expression (5). Where (x, y, z) components of the normal vector H are denoted by (hx, hy, hz), an inclination ex about an X axis and an inclination θy about a Y axis of the first movable portion 21 can be expressed by expressions (6) and (7), respectively.

$$\vec{AB} \quad (1)$$

$$\vec{AB} = (x_{152} - x_{151}, y_{152} - y_{151}, z_{152} - z_{151}) \quad (2)$$

$$\vec{AC} \quad (3)$$

$$\vec{AC} = (x_{153} - x_{151}, y_{153} - y_{151}, z_{153} - z_{151}) \quad (4)$$

$$\vec{H} = \vec{AB} \times \vec{AC} \quad (5)$$

$$\theta_x = \arctan\left(\frac{hy}{hz}\right) \quad (6)$$

$$\theta_y = \arctan\left(\frac{hx}{hz}\right) \quad (7)$$

The three first sensors 151, 152 and 153 do not necessarily have to be arranged at equal intervals in the circumferential direction but need only be fixed in position. It is however preferable to set the intervals between the three first sensors 151, 152 and 153 as long as possible in order to improve the precision of detecting the inclinations θx and θy. It is thus most preferable for the three first sensors 151, 152 and 153 to be arranged 120° apart in the circumferential direction.

As described above, the first detection unit 91 in the force sensor 1B of the third variation includes the three first sensors 151, 152 and 153 that are arranged at equal intervals or 120° apart in the circumferential direction on the top surface of the base 10. The intervals between the first sensors 151, 152 and 153 are increased as a result. The force sensor 1B can thus improve precision of detecting the angle of inclination of the first movable portion 21.

(Fourth Variation)

Figure 19:
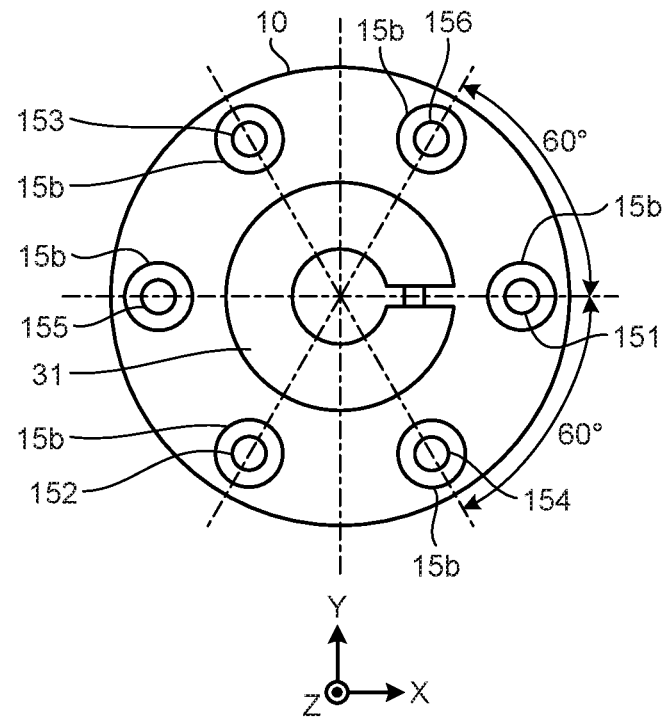
FIG. 19 is a schematic view illustrating a force sensor according to a fourth variation.

FIG. 19 is a schematic view illustrating a force sensor according to a fourth variation. FIG. 19 illustrates an example where six first sensors are provided. Six first sensors 151 to 156 are installed at positions corresponding to vertices of a regular hexagon. By using the method described in the third variation, an angle of inclination of a first movable portion 21 is determined with the first sensors 151, 152 and 153 as a first set and, in a similar manner, an angle of inclination of the first movable portion 21 is determined with the first sensors 154, 155 and 156 as a second set. A more accurate angle can be obtained by averaging the two results. Moreover, a force sensor 1B can be used without interruption even when one of the sets fails. Note that in using this method, the first sensor does not necessarily have to be installed at six positions but need only be installed at four or more positions. The first and second sets are prepared by selecting three specific sensors from among the four or more first sensors to then determine the angle of inclination of the first movable portion 21 by the aforementioned method. The same first sensor may be included in a plurality of sets.

As described above, a first detection unit 91 including the six first sensors 151 to 156 uses the three first sensors 151, 152 and 153 thereamong as the first set to detect the angle of inclination of the first movable portion 21 on the basis of the positions of the three first sensors 151, 152 and 153 and the distance to a detection target, uses the three first sensors 154, 155 and 156 different from the first set as the second set to detect the angle of inclination of the first movable portion 21, and obtains the angle of inclination of the first movable portion 21 by averaging the plurality of detected results. The force sensor 1B can therefore obtain a more accurate angle by averaging the two results. Moreover, the force sensor 1B can be used without interruption even when one of the sets fails.

(Fifth Variation)

Figure 20:
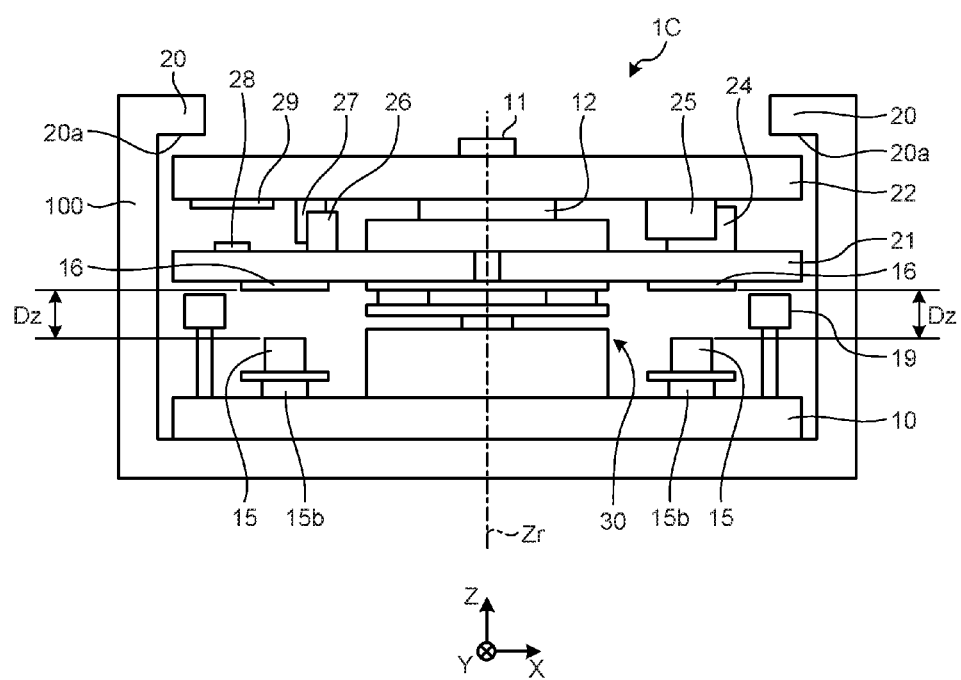
FIG. 20 is a schematic view illustrating a force sensor according to a fifth variation.
Figure 21:
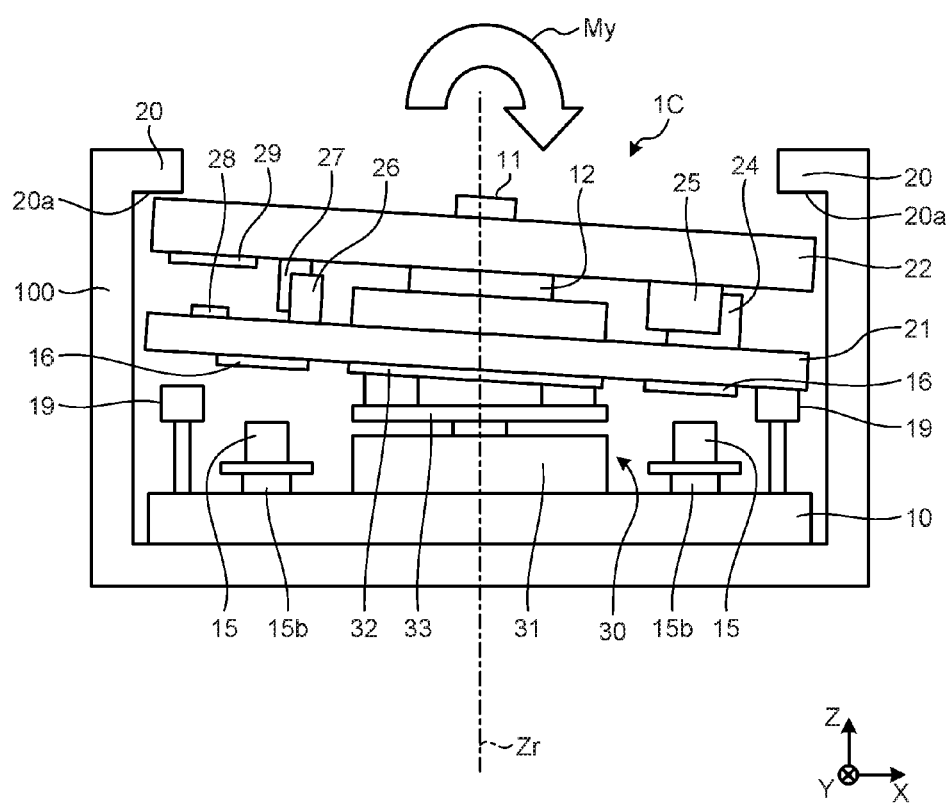
FIG. 21 is a schematic view illustrating a state in which excessive moment is applied to the force sensor according to the fifth variation.
Figure 22:
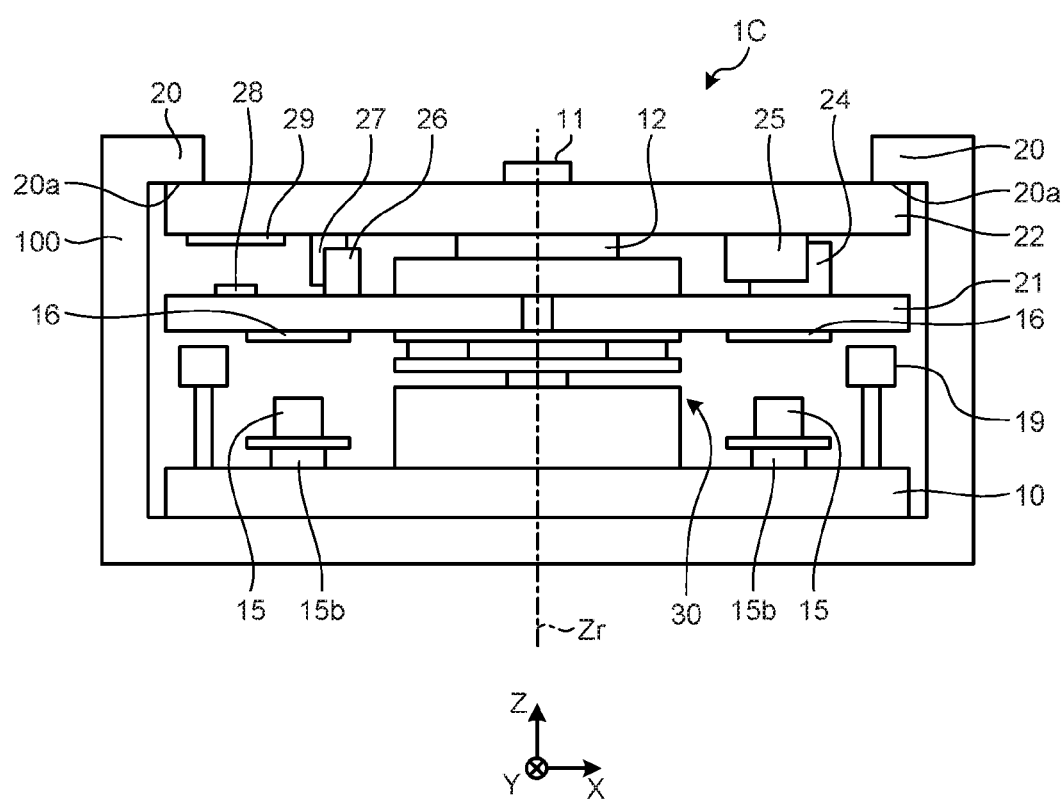
FIG. 22 is a schematic view illustrating a state in which excessive external force in a Z-axis direction is applied to the force sensor according to the fifth variation.

FIG. 20 is a schematic view illustrating a force sensor according to a fifth variation. FIG. 21 is a schematic view illustrating a state in which excessive moment is applied to the force sensor according to the fifth variation. FIG. 22 is a schematic view illustrating a state in which excessive external force in a Z-axis direction is applied to the force sensor according to the fifth variation. Note that a component that is the same as the one described in the aforementioned embodiment is assigned the same reference numeral as that assigned to the one in the aforementioned embodiment to omit redundant description.

As illustrated in FIG. 21, the height of a stopper 19 in the Z-axis direction is adjusted such that a tip of the stopper 19 comes into contact with a first movable portion 21 when a load exceeding a load with which a support 30 can undergo elastic deformation is applied to a force sensor 1C. Accordingly, the stopper 19 can prevent permanent deformation of the support 30 when excessive external force causing the first movable portion 21 and a second movable portion 22 to rock is applied to the force sensor 1C.

The force sensor 1C according to the fifth variation includes a stopper 20 that prevents excessive extensional deformation of the support 30 even when axial force Fz parallel to the Z axis with negative magnitude, namely external force pulling the first movable portion 21 and the second movable portion 22 upward (in a positive direction of the Z axis), acts on the force sensor 1C. The stopper 20 is provided at an upper end of a housing 100 and protrudes in the shape of a flange toward the center. The stopper 20 may be provided all around the housing 100, or a protrusion with a small width in a circumferential direction may be provided at a plurality of positions. An interval between a lower end face 20a of the stopper 20 and the second movable portion 22 is set to be smaller than a distance that falls within the limit of elastic deformation of the support 30 when it is deformed in a direction to be extended.

When external force in a positive Z-axis direction is applied to the force sensor 1C, the first movable portion 21 and the second movable portion 22 undergo upward displacement, and the support 30 is extended. When the external force is applied excessively, the support 30 is extended considerably to possibly undergo permanent deformation. According to the force sensor 1C of the fifth variation, however, the second movable portion 22 undergoing a certain amount of displacement in the positive Z-axis direction comes into contact with the lower end face 20a of the stopper 20 and does not undergo further displacement as illustrated in FIG. 22, so that the permanent deformation of the support 30 does not occur.

As described above, the force sensor 1C according to the fifth variation includes the stopper 19 (a first stopper) restricting a rocking angle of the first movable portion 21 and the second movable portion 22, the stopper 20 (a second stopper) restricting the amount of displacement of the first movable portion 21 and the second movable portion 22 in the direction in which the support 30 is extended, and permanent magnets 24 and 25 (third stoppers) restricting an angle of rotation about a central axis Zr of the second movable portion 22. As a result, the force sensor 1C can prevent breakage of the support 30 or the like even when excessive external force acts on the force sensor 1C.

Moreover, the stopper 19 (first stopper) in the force sensor 1C of the fifth variation is a portion protruding from a base 10 toward the first movable portion 21, is provided at three or more positions at equal intervals in the circumferential direction about the central axis Zr of the support 30, and has the height from the base 10 allowing the tip of the stopper 19 to come into contact with the first movable portion 21 when a load exceeding a load with which the support 30 can undergo elastic deformation is applied to the force sensor 1C. Accordingly, the force sensor 1C can prevent permanent deformation of the support 30 even when excessive external force causing the first movable portion 21 and the second movable portion 22 to rock is applied to the force sensor 1C.

Moreover, the stopper 20 (second stopper) in the force sensor 1C of the fifth variation is the flanged portion that is provided at the upper end of the housing 100 arranged to cover the periphery of the force sensor 1C and protrudes toward the center. The stopper 20 has the height allowing the lower end face 20a of the stopper 20 to come into contact with the second movable portion 22 when a load exceeding a load with which the support 30 can undergo elastic deformation is applied to the force sensor 1C. Accordingly, the second movable portion 22 undergoing the certain amount of displacement comes into contact with the lower end face 20a of the stopper 20 and does not undergo further displacement. The force sensor 1C can therefore prevent permanent deformation of the support 30.

Moreover, the permanent magnets 24 and 25 (third stoppers) in the force sensor 1C of the fifth variation are permanent magnets provided on, respectively, surfaces of the first movable portion 21 and the second movable portion 22 facing each other. The permanent magnet 24 provided on the first movable portion 21 protrudes from the surface thereof toward the second movable portion 22, while the permanent magnets 25 provided on the second movable portion 22 protrude from the surface thereof toward the first movable portion 21 and are provided at respective positions sandwiching the permanent magnet 24 provided on the first movable portion 21 in the circumferential direction. Accordingly, when external force is applied to cause the second movable portion 22 to rotate, the plurality of permanent magnets 24 and 25 (third stoppers) moves closer to one another to have increased repulsion and generate reaction force against the external force. The force sensor 1C can therefore prevent breakage of a joint 2 or the like.

(Sixth Variation)

Figure 23:
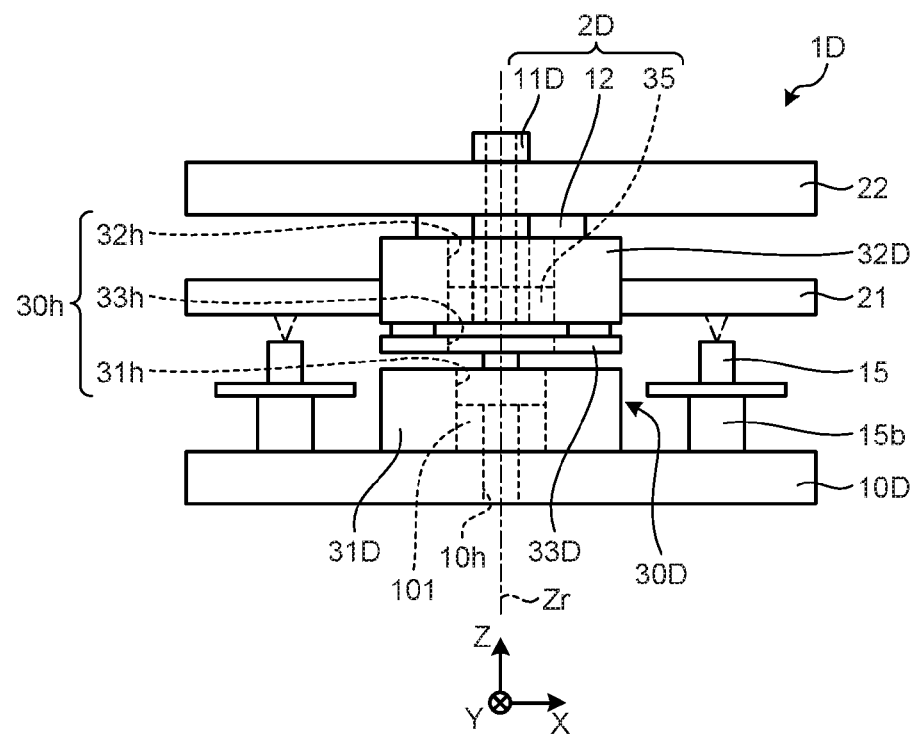
FIG. 23 is a schematic view illustrating a force sensor according to a sixth variation.
Figure 24:
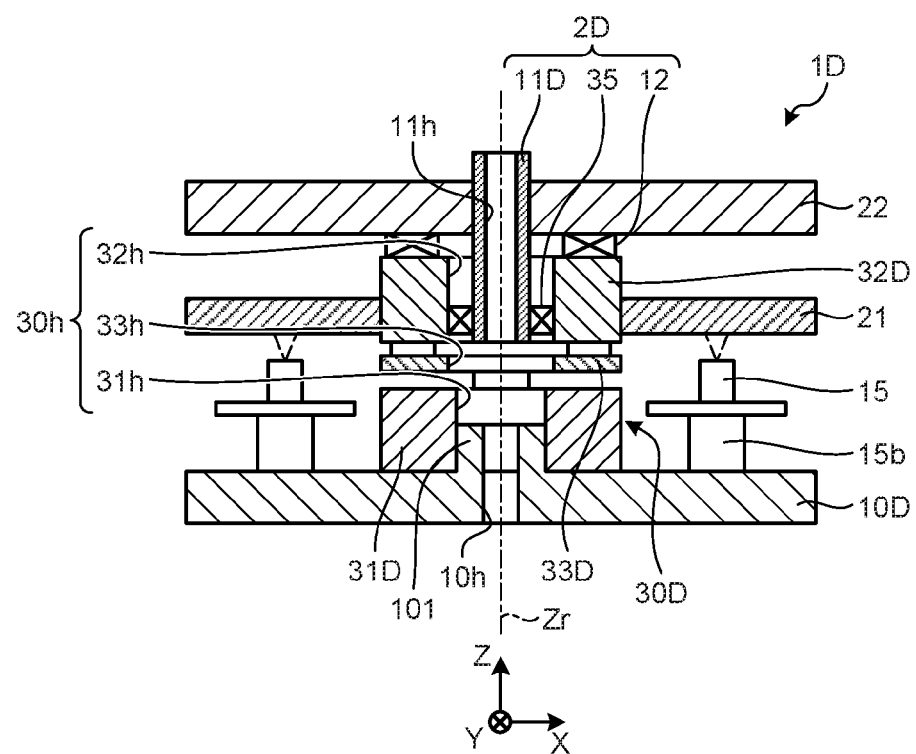
FIG. 24 is a cross sectional view taken along a plane including a central axis of the force sensor according to the sixth variation.
Figure 25:
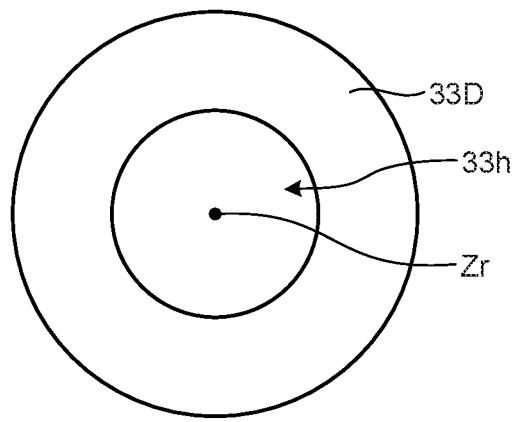
FIG. 25 is a plan view illustrating an example of a disc according to the sixth variation.
Figure 26:
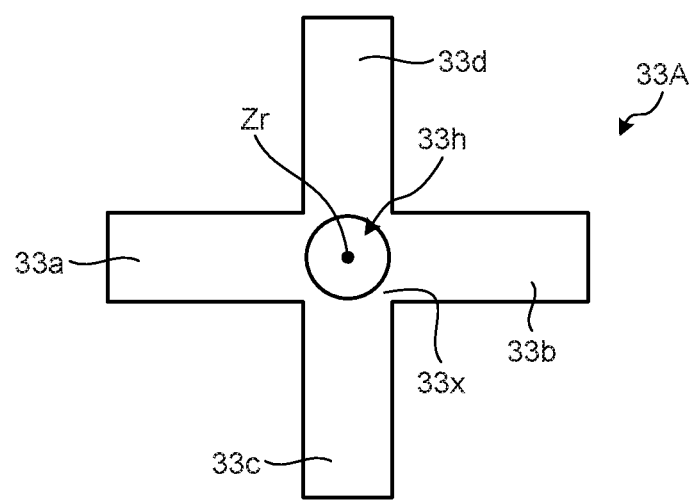
FIG. 26 is a plan view illustrating an example of the disc according to the sixth variation.

FIG. 23 is a schematic view illustrating a force sensor according to a sixth variation. FIG. 24 is a cross sectional view taken along a plane including a central axis of the force sensor according to the sixth variation. FIG. 25 is a plan view illustrating an example of a disc according to the sixth variation. FIG. 26 is a plan view illustrating an example of the disc according to the sixth variation. Note that a component that is the same as the one described in the aforementioned embodiment is assigned the same reference numeral as that assigned to the one in the aforementioned embodiment to omit redundant description.

As illustrated in FIG. 23, a force sensor 1D according to the sixth variation includes a base 10D, a support 30D and a shaft 11D. The base 10D is a disc-like member or the like and includes a first internal passage 10h serving as a through hole passing through the base 10D in a Z-axis direction. The base 10D also includes a protrusion 101 protruding in the Z-axis direction from the center of a surface facing a first movable portion 21. The first internal passage 10h passes through the protrusion 101. The protrusion 101 is thus cylindrical in shape.

The support 30D includes a lower fixture 31D, an upper fixture 32D, and a disc 33D. The lower fixture 31D is made of metal such as aluminum. The lower fixture 31D is a cylindrical member including, at the center thereof, a through hole 31h passing through the lower fixture 31D in the Z-axis direction, and is fixed to the base 10D such that an end face of the lower fixture 31D is perpendicular to the Z axis. The protrusion 101 of the base 10D is press fitted into the through hole 31h so that the support 30D is fixed to the base 10D, for example. The upper fixture 32D is made of metal such as aluminum. The upper fixture 32D is a cylindrical member including, at the center thereof, a through hole 32h passing through the upper fixture 32D in the Z-axis direction, and is fixed by the lower fixture 31D through the disc 33D such that an end face of the upper fixture 32D is perpendicular to the Z axis. The disc 33D is a plate spring, for example. The disc 33D includes a through hole 33h passing therethrough in the Z-axis direction. As illustrated in FIG. 25, the through hole 33h passes through the center of the disc-like disc 33D. The through holes 31h, 33h and 32h are arranged to overlap one another when viewed in the Z-axis direction. The through holes 31h, 33h and 32h thus form a second internal passage 30h passing through the support 30D in the Z-axis direction. The second internal passage 30h overlaps the first internal passage 10h when viewed in the Z-axis direction. In other words, the first internal passage 10h and the second internal passage 30h are arranged to be aligned on the same straight line.

A second movable portion 22 is supported on the support 30D to be able to rotate about the Z axis by a joint 2D. The joint 2D of the sixth variation includes a deep groove ball bearing 35, the shaft 11D, and a thrust roller bearing 12. As illustrated in FIG. 24, the shaft 11D is press-fitted and fixed inside an inner ring of the deep groove ball bearing 35. One end of the shaft 11D is located inside the through hole 32h. More specifically, the position of the one end of the shaft 11D in the Z-axis direction is aligned with an end face of the upper fixture 32D facing the disc 33D. The other end of the shaft 11D protrudes out of the second movable portion 22 in the Z-axis direction. The shaft 11D includes a third internal passage 11h serving as a through hole passing through the shaft 11D in the Z-axis direction. The third internal passage 11h overlaps the first internal passage 10h and the second internal passage 30h when viewed in the Z-axis direction. In other words, the first internal passage 10h, the second internal passage 30h, and the third internal passage 11h are arranged to be aligned on the same straight line.

Note that when the through hole 33h is provided in a plate spring portion 33A described in the second variation, the through hole 33h is provided to pass through the center of a base portion 33x as illustrated in FIG. 26, for example. The area of the through hole 33h is smaller than the area of the base portion 33x.

As described above, the joint 2D in the force sensor 1D of the sixth variation includes the shaft 11D passing through the second movable portion 22. The first internal passage 10h passing through the base 10D, the second internal passage 30h passing through the support 30D, and the third internal passage 11h passing through the shaft 11D are arranged to be aligned on the same straight line.

The force sensor 1D is provided with a wiring or piping reaching the second movable portion 22 from the base 10D. The wiring or piping in the force sensor 1D of the sixth variation can reach the second movable portion 22 from the base 10D through the first internal passage 10h, the second internal passage 30h, and the third internal passage 11h. The force sensor 1D can thus achieve size reduction of the force sensor 1D as a whole compared to when the wiring or piping passes outside each member.

The invention claimed is:

1. A force sensor comprising:
   a base;
   a first movable portion arranged to face the base;
   a second movable portion arranged to face the first movable portion, wherein the first movable portion and the second movable portion are movable to be tilted relative to the base;
   a support that is provided on the base and rockably supports the first movable portion and the second movable portion;
   a joint that is provided to the support and rotatably supports the second movable portion;
   a first detection unit that includes three or more first sensors and that detects a first force component causing the first movable portion and the second movable portion to rock; and
   a second detection unit that includes a second sensor and that detects a second force component causing the second movable portion to rotate,
   wherein the first detection unit detects the first force component based on sensor outputs of the three or more first sensors, each of the outputs being changed when external force is applied to at least one of the first movable portion and the second movable portion to allow the first movable portion to be tilted relative to the base, and
   wherein the second detection unit detects the second force component based on a sensor output of the second sensor, the sensor output being changed when external force is applied to at least one of the first movable portion and the second movable portion to allow the second movable portion to rotate.

2. The force sensor according to claim 1, wherein the first movable portion and the second movable portion are arranged above the base in a vertical direction.

3. The force sensor according to claim 1, wherein
   the first detection unit includes the three or more first sensors, and
   the three or more first sensors are configured to emit light and detect reflected light of the light.

4. The force sensor according to claim 1, wherein
   the first detection unit includes four first sensors, and
   two of the four first sensors are arranged on one straight line while remaining two first sensors are arranged on another straight line orthogonal to the one straight line.

5. The force sensor according to claim 1, wherein
the support includes: a first fixture supported by the base; a plate spring portion that has a plate-like shape and is supported by the first fixture through a spacer to be able to undergo elastic deformation; and a second fixture supported by the plate spring portion through a spacer,
the plate spring portion includes: a base portion having a plate-like shape; and a
plurality of protrusions, where the protrusions are on the same plane as the base portion and protrude from the base portion, and surfaces of the protrusions come into contact with the spacer, and,
when external force is applied to the first movable portion, a part of each of the protrusions deforms depending on a displacement of the first movable portion, the part being closer to the base portion relative to a position in contact with the spacer.

6. The force sensor according to claim 5, wherein the support includes a plurality of the plate spring portions connected to face one another with spacing formed among the plate spring portions.

7. The force sensor according to claim 1, wherein the first detection unit includes the three or more first sensors that are provided on a top surface of the base and are configured to emit light and to detect reflected light of the light,
the first detection unit calculates distances from each of the three or more first sensors to a corresponding reflector based on the sensor outputs of the three or more first sensors, and
the first detection unit calculates the angle of inclination of the first movable portion by using coordinates of the three of more first sensors and coordinates of the reflectors.

8. The force sensor according to claim 1, wherein the first detection unit includes three first sensors that are arranged at equal intervals, each interval being 120°, in a circumferential direction on a top surface of the base.

9. The force sensor according to claim 7, wherein
the first detection unit includes four or more first sensors,
the first detection unit uses three of the first sensors as a first set, to calculate an angle of inclination of the first movable portion on the basis of coordinates of the three first sensors and the coordinates of the reflectors,
the first detection unit uses three of the first sensors as a second set in which at least one first sensor is different from the first set, to calculate an angle of inclination of the first movable portion on the basis of coordinates of the three first sensors and the coordinates of the reflectors, and
the first detection unit obtains the angle of inclination of the first movable portion by averaging the angle calculated using the first sensors of the first set and the angle calculated using the first sensors of the second set.

10. The force sensor according to claim 1, further comprising:
a first stopper restricting a rocking angle of the first movable portion and the second movable portion;
a second stopper restricting an amount of displacement of the first movable portion and the second movable portion in a direction in which the support is to be extended; and
a third stopper restricting an angle of rotation about a central axis of the second movable portion.

11. The force sensor according to claim 10, wherein
the first stopper is a portion protruding from the base toward the first movable portion, is provided at three or more positions at equal intervals in a circumferential direction about a central axis of the support, and
the first stopper has a height from the base allowing a tip of the first stopper to come into contact with the first movable portion when a load exceeding a load with which the support is elastically deformed is applied to the force sensor.

12. The force sensor according to claim 10, wherein the second stopper is a flanged portion that is provided at an upper end of a housing arranged to cover a periphery of the force sensor and protrudes toward a center, and
the second stopper has a height allowing a lower end face of the second stopper to come into contact with the second movable portion when a load exceeding a load with which the support is elastically deformed is applied to the force sensor.

13. The force sensor according to claim 10, wherein
the third stopper includes permanent magnets that are provided on, respectively, a surface of the first movable portion and a surface of the second movable portion facing each other, the permanent magnet provided on the first movable portion protrudes from the surface of the first movable portion toward the second movable portion, and
the permanent magnets provided on the second movable portion protrude from the surface of the second movable portion toward the first movable portion and are provided at positions sandwiching the permanent magnet provided on the first movable portion in a circumferential direction.

14. The force sensor according to claim 1, wherein
the joint includes a shaft passing through the second movable portion, and
a first internal passage passing through the base, a second internal passage passing through the support, and a third internal passage passing through the shaft are arranged on the same straight line.

15. The force sensor according to claim 1, wherein
wherein the first movable portion and the second movable portion are movable to be tilted relative to the base in such a manner that surfaces of the first movable portion and the second movable portion facing each other remain parallel to each other.

* * * * *